US012811653B2

(12) United States Patent
Elshafie et al.

(10) Patent No.: US 12,811,653 B2
(45) Date of Patent: Nov. 24, 2026

(54) UPLINK CHANNEL STATE INFORMATION REPORTING

(71) Applicant: QUALCOMM Incorporated, San Diego, CA (US)

(72) Inventors: Ahmed Elshafie, San Diego, CA (US); Yu Zhang, San Diego, CA (US); Wanshi Chen, San Diego, CA (US); Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/291,514

(22) PCT Filed: Sep. 28, 2021

(86) PCT No.: PCT/CN2021/121361
§ 371 (c)(1),
(2) Date: Jan. 23, 2024

(87) PCT Pub. No.: WO2023/050068
PCT Pub. Date: Apr. 6, 2023

(65) Prior Publication Data
US 2024/0348308 A1 Oct. 17, 2024

(51) Int. Cl.
*H04B 7/06* (2006.01)
*H04L 5/00* (2006.01)

(52) U.S. Cl.
CPC ......... *H04B 7/0639* (2013.01); *H04B 7/0626* (2013.01); *H04L 5/005* (2013.01)

(58) Field of Classification Search
CPC .... H04B 7/0639; H04B 7/0626; H04B 7/063; H04B 7/0404; H04L 5/005; H04L 5/0048; H04L 5/0057
(Continued)

(56) References Cited

U.S. PATENT DOCUMENTS

2013/0322273 A1* 12/2013 Etemad ................. H04W 36/20 370/252
2013/0322276 A1* 12/2013 Pelletier ................ H04W 24/10 370/252
(Continued)

FOREIGN PATENT DOCUMENTS

WO WO-2020253585 A1 12/2020

OTHER PUBLICATIONS

International Search Report and Written Opinion—PCT/CN2021/121361—ISA/EPO—May 16, 2022.
(Continued)

*Primary Examiner* — Mang Hang Yeung
(74) *Attorney, Agent, or Firm* — Holland & Hart, LLP

(57) ABSTRACT

Methods, systems, and devices for wireless communications are described. Aspects of the present disclosure provide techniques for uplink channel state information (CSI) reporting that supports transmission precoding matrix indicator (TPMI) selection. A user equipment (UE) may receive CSI reference signals (CSI-RSs), and may perform measurements on the CSI-RSs. The UE may transmit an uplink CSI report to a base station based on the measurements. The CSI report may include an indication of a set of one or more candidate TPMIs, rank indicators (RIs), or both. The base station may test the candidate TPMIs, one or more other TPMIs, or both, to received sounding reference signals (SRSs) and select a TPMI for subsequent signaling. The base station may transmit an uplink grant (e.g., via downlink control information (DCI)) indicating the selected TPMI. The DCI may be a single-stage DCI a timeline.

25 Claims, 16 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2021/0258886 | A1* | 8/2021 | Sun | H04W 52/146 |
| 2022/0286249 | A1* | 9/2022 | Liu | H04L 5/0051 |
| 2024/0421864 | A1* | 12/2024 | Nilsson | H04B 7/0456 |

OTHER PUBLICATIONS

Partial International Search Report—PCT/CN2021/121361—ISA/EPO—Mar. 25, 2022.
Samsung: "Codebook-Based UL Transmission," 3GPP TSG RAN WG1 Meeting #91, R1-1721399, NR UL CB-Based TXR1, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 27, 2017 (Nov. 27, 2017), XP051363834, 17 pages, Section 6 2-7, figure 3.

* cited by examiner

UPLINK CHANNEL STATE INFORMATION REPORTING

CROSS REFERENCE

The present Application is a 371 national stage filing of International PCT Application No. PCT/CN2021/121361 by ELSHAFIE et al. entitled "UPLINK CHANNEL STATE INFORMATION REPORTING," filed Sep. 28, 2021, which is assigned to the assignee hereof, and which is expressly incorporated by reference in its entirety herein.

FIELD OF TECHNOLOGY

The following relates to wireless communications, including uplink channel state information reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A user equipment (UE) may transmit uplink signaling according to a transmission precoding matrix indicator (TPMI).

SUMMARY

The described techniques relate to improved methods, systems, devices, and apparatuses that support uplink channel state information reporting. Generally, the described techniques provide for a user equipment (UE) to determine a suggested transmission precoding matrix indicator (TPMI) and provide it to a base station. For example, the UE may receive channel state information reference signals (CSI-RSs), and may perform measurements on the CSI-RSs. The UE may transmit an uplink channel state information (CSI) report to the base station based on the measurements. The CSI report may include an indication of a set of one or more candidate TPMIs, rank indicators (RIs), or both. The base station may test the candidate TPMIs, one or more other TPMIs, or both, to received SRSs (e.g., previously received SRSs, or newly received SRSs), and select a TPMI for subsequent uplink signaling. The base station may then transmit an uplink grant (e.g., via DCI) indicating the selected TPMI. The DCI may be a single-stage DCI indicating a TPMI that is one of the candidate TPMIs. Or the DCI may be a timeline, where the first-stage DCI may indicate whether the TPMI is from the set of candidate TPMIs or not, and the second-stage DCI may indicate the TPMI.

A method for wireless communications at a user equipment (UE) is described. The method may include receiving, from a base station, one or more channel state information reference signals, performing one or more channel state information measurements on the one or more channel state information reference signals, transmitting, to the base station, an uplink channel state information report including a set of candidate transmission precoding matrix indicators, a set of candidate rank indicators, or a combination thereof based on the one or more channel state information measurements, and receiving, from the base station and in response to transmission of the uplink channel state information report, downlink control information including an indication of a transmission precoding matrix indicator to be used by the UE for uplink signaling.

An apparatus for wireless communications at a UE is described. The apparatus may include a processor, memory coupled with the processor, and instructions stored in the memory. The instructions may be executable by the processor to cause the apparatus to receive, from a base station, one or more channel state information reference signals, perform one or more channel state information measurements on the one or more channel state information reference signals, transmit, to the base station, an uplink channel state information report including a set of candidate transmission precoding matrix indicators, a set of candidate rank indicators, or a combination thereof based on the one or more channel state information measurements, and receive, from the base station and in response to transmission of the uplink channel state information report, downlink control information including an indication of a transmission precoding matrix indicator to be used by the UE for uplink signaling.

Another apparatus for wireless communications at a UE is described. The apparatus may include means for receiving, from a base station, one or more channel state information reference signals, means for performing one or more channel state information measurements on the one or more channel state information reference signals, means for transmitting, to the base station, an uplink channel state information report including a set of candidate transmission precoding matrix indicators, a set of candidate rank indicators, or a combination thereof based on the one or more channel state information measurements, and means for receiving, from the base station and in response to transmission of the uplink channel state information report, downlink control information including an indication of a transmission precoding matrix indicator to be used by the UE for uplink signaling.

A non-transitory computer-readable medium storing code for wireless communications at a UE is described. The code may include instructions executable by a processor to receive, from a base station, one or more channel state information reference signals, perform one or more channel state information measurements on the one or more channel state information reference signals, transmit, to the base station, an uplink channel state information report including a set of candidate transmission precoding matrix indicators, a set of candidate rank indicators, or a combination thereof based on the one or more channel state information measurements, and receive, from the base station and in response to transmission of the uplink channel state information report, downlink control information including an indication of a transmission precoding matrix indicator to be used by the UE for uplink signaling.

Some examples of the method, apparatuses, and non-transitory computer-readable medium described herein may further include operations, features, means, or instructions for monitoring for the one or more channel state information reference signals using a first set of ports, where receiving the one or more channel state information reference signals may be based on the monitoring and transmitting, to the base station, uplink signaling using the indicated transmission precoding matrix indicator for uplink signaling on a physical uplink shared channel using the first set of ports.

In some examples of the method, apparatuses, and non-transitory computer-readable medium described herein, transmitting the uplink channel state information report may include operations, features, means, or instructions for transmitting, in the uplink channel state information report, an indication of a set of channel resource indicators, each channel resource indicator of the set of channel resource indicators associated with a candidate transmission precoding matrix indicator of the set of candidate transmission precoding matrix indicators.

Some examples of the method, apparatuses, and non-transitory computer-readable medium described herein may further include operations, features, means, or instructions for receiving, from the base station, control signaling including an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

In some examples of the method, apparatuses, and non-transitory computer-readable medium described herein, receiving the control signaling may include operations, features, means, or instructions for receiving the control signaling during a channel state information reference signal configuration procedure.

In some examples of the method, apparatuses, and non-transitory computer-readable medium described herein, the control signaling includes radio resource control signaling, a media access control (MAC) control element (CE), or a combination thereof.

In some examples of the method, apparatuses, and non-transitory computer-readable medium described herein, the control signaling including the indication may be associated with a channel state information reference signal resource, a set of channel state information resources, or a combination thereof.

In some examples of the method, apparatuses, and non-transitory computer-readable medium described herein, receiving the downlink control information may include operations, features, means, or instructions for receiving a single-stage downlink control information message including an index associated with a precoding matrix indicator of the set of candidate transmission precoding matrix indicators.

In some examples of the method, apparatuses, and non-transitory computer-readable medium described herein, receiving the downlink control information may include operations, features, means, or instructions for receiving a first two-stage downlink control information message indicating that the transmission precoding matrix indicator for uplink signaling may be located in a second two-stage downlink control information message and receiving the second two-stage downlink control information message including the indication of the transmission precoding matrix indicator based on receiving the first two-stage downlink control information message.

In some examples of the method, apparatuses, and non-transitory computer-readable medium described herein, the first two-stage downlink control information message may indicate that the transmission precoding matrix indicator is one of the set of candidate transmission precoding matrix indicators.

In some examples of the method, apparatuses, and non-transitory computer-readable medium described herein, the first two-stage downlink control information message may indicate that the transmission precoding matrix indicator is not one of the set of candidate transmission precoding matrix indicators.

Some examples of the method, apparatuses, and non-transitory computer-readable medium described herein may further include operations, features, means, or instructions for receiving, in the first two-stage downlink control information message, a set of time and frequency resources on which to receive the second two-stage downlink control information message.

Some examples of the method, apparatuses, and non-transitory computer-readable medium described herein may further include operations, features, means, or instructions for transmitting one or more sounding reference signals to the base station on a first set of frequency resources that may be different than a second set of frequency resources on which the UE transmits the uplink signaling and receiving, from the base station based on transmitting the sounding reference signals, second downlink control information including a second indication of a second transmission precoding matrix indicator for uplink signaling on the first set of frequency resources, where the precoding matrix indicator may be associated with the uplink signaling on the second set of frequency resources.

A method for wireless communications at a base station is described. The method may include transmitting, to a UE, one or more channel state information reference signals, receiving, from the UE, an uplink channel state information report including a set of candidate transmission precoding matrix indicators, a set of candidate rank indicators, or a combination thereof based on the one or more channel state information reference signals, and transmitting, to the UE and in response to receiving the uplink channel state information report, downlink control information including an indication of a transmission precoding matrix indicator to be used by the UE for uplink signaling.

An apparatus for wireless communications at a base station is described. The apparatus may include a processor, memory coupled with the processor, and instructions stored in the memory. The instructions may be executable by the processor to cause the apparatus to transmit, to a UE, one or more channel state information reference signals, receive, from the UE, an uplink channel state information report including a set of candidate transmission precoding matrix indicators, a set of candidate rank indicators, or a combination thereof based on the one or more channel state information reference signals, and transmit, to the UE and in response to receiving the uplink channel state information report, downlink control information including an indication of a transmission precoding matrix indicator to be used by the UE for uplink signaling.

Another apparatus for wireless communications at a base station is described. The apparatus may include means for transmitting, to a UE, one or more channel state information reference signals, means for receiving, from the UE, an uplink channel state information report including a set of candidate transmission precoding matrix indicators, a set of candidate rank indicators, or a combination thereof based on the one or more channel state information reference signals, and means for transmitting, to the UE and in response to receiving the uplink channel state information report, downlink control information including an indication of a transmission precoding matrix indicator to be used by the UE for uplink signaling.

A non-transitory computer-readable medium storing code for wireless communications at a base station is described. The code may include instructions executable by a processor to transmit, to a UE, one or more channel state information reference signals, receive, from the UE, an uplink channel state information report including a set of candidate transmission precoding matrix indicators, a set of candidate rank indicators, or a combination thereof based on the one or more channel state information reference signals, and transmit, to the UE and in response to receiving the uplink channel state information report, downlink control information including an indication of a transmission precoding matrix indicator to be used by the UE for uplink signaling.

In some examples of the method, apparatuses, and non-transitory computer-readable medium described herein, transmitting the one or more channel state information reference signals may include operations, features, means, or instructions for transmitting the one or more channel state information reference signals using a first set of ports.

Some examples of the method, apparatuses, and non-transitory computer-readable medium described herein may further include operations, features, means, or instructions for receiving, from the UE using the first set of ports, uplink signaling according to the indicated transmission precoding matrix indicator.

Some examples of the method, apparatuses, and non-transitory computer-readable medium described herein may further include operations, features, means, or instructions for receiving, from the UE, one or more sounding reference signals, applying, to the one or more sounding reference signals, a set of multiple transmission precoding matrix indicators including the set of candidate transmission precoding matrix indicators, and selecting, from the set of multiple transmission precoding matrix indicators, the precoding matrix indicator, where transmitting the downlink control information may be based on the selecting.

Some examples of the method, apparatuses, and non-transitory computer-readable medium described herein may further include operations, features, means, or instructions for transmitting, to the UE, control signaling including an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

In some examples of the method, apparatuses, and non-transitory computer-readable medium described herein, transmitting the control signaling may include operations, features, means, or instructions for transmitting the control signaling during a channel state information reference signal configuration procedure.

In some examples of the method, apparatuses, and non-transitory computer-readable medium described herein, the control signaling includes radio resource control signaling, a MAC control element (CE), or a combination thereof.

In some examples of the method, apparatuses, and non-transitory computer-readable medium described herein, the control signaling including the indication may be associated with a channel state information reference signal resource, a set of channel state information resources, or a combination thereof.

In some examples of the method, apparatuses, and non-transitory computer-readable medium described herein, transmitting the downlink control information may include operations, features, means, or instructions for transmitting a single-stage downlink control information message including an index associated with a precoding matrix indicator of the set of candidate transmission precoding matrix indicators.

In some examples of the method, apparatuses, and non-transitory computer-readable medium described herein, transmitting the downlink control information may include operations, features, means, or instructions for transmitting a first two-stage downlink control information message indicating that the indication of the transmission precoding matrix indicator for uplink signaling may be located in a second two-stage downlink control information message and the second two-stage downlink control information message including the indication of the transmission precoding matrix indicator based on receiving the first two-stage downlink control information message.

In some examples of the method, apparatuses, and non-transitory computer-readable medium described herein, the first two-stage downlink control information message may indicate that the transmission precoding matrix indicator is one of the set of candidate transmission precoding matrix indicators.

In some examples of the method, apparatuses, and non-transitory computer-readable medium described herein, the first two-stage downlink control information message may indicate that the transmission precoding matrix indicator is not one of the set of candidate transmission precoding matrix indicators.

Some examples of the method, apparatuses, and non-transitory computer-readable medium described herein may further include operations, features, means, or instructions for transmitting the first two-stage downlink control information message includes transmitting, in the first two-stage downlink control information message, a set of time and frequency resources on which to receive the second two-stage downlink control information message.

Some examples of the method, apparatuses, and non-transitory computer-readable medium described herein may further include operations, features, means, or instructions for receiving one or more sounding reference signals from the UE on a first set of frequency resources that may be different than a second set of frequency resources on which the UE transmits the uplink signaling and transmitting, to the UE based on transmitting the sounding reference signals, second downlink control information including a second indication of a second transmission precoding matrix indicator for uplink signaling on the first set of frequency resources, where the precoding matrix indicator may be associated with the uplink signaling on the second set of frequency resources.

DETAILED DESCRIPTION

A user equipment (UE) may transmit uplink signaling according to a transmission precoding matrix indicator (TPMI). In some examples, a UE may transmit sounding reference signals (SRSs) in one or more directions. A base station may receive the SRSs, select a TPMI for uplink signaling based on measurements made of the SRSs at the base station, and then indicate (e.g., in downlink control information (DCI)) the TPMI to the UE so that the UE may use the TPMI for subsequent uplink signaling. However, some UEs (e.g., located at a cell-edge) may expend a high amount of power to transmit the SRSs at a high enough transmission power to be received by the base station. This may result in significant power expenditures at the UE.

Aspects of the present disclosure describe techniques for uplink channel state information (CSI) reporting that supports TPMI selection at a base station. For example, the UE may utilize uplink CSI reporting to transmit candidate TPMIs, rank indicators (RIs), or the like, to the base station based on one or more measurements performed on received CSI-RSs.

The base station may test the candidate TPMIs, one or more other TPMIs, or both, on received SRSs. For example, the base station may apply the candidate TPMIs or other TPMIs to previously received SRSs, or the UE may transmit new SRSs (e.g., on SRS resources designated for the purpose of testing the TPMIs). The base station may select a TPMI for subsequent uplink signaling based on the testing.

The base station may indicate, to the UE, a selected TPMI for subsequent uplink signaling. In some examples, the base station may select a TPMI from the uplink TPMI candidates indicated by the UE. In such examples, the base station may indicate the TPMI in a single-stage DCI. In some examples, the base station may select a different TPMI (e.g., that is not included in the set of candidate TPMIs). In such cases, the base station may utilize a two stage DCI. The first-stage of the two stage DCI may indicate whether the base station selects a TPMI from the candidate TPMIs or selects a new TPMI. The second-stage of the two stage DCI may indicate the TPMI. By leveraging complementary measurement and reporting for determining a TPMI at a base station, the UE and the base station may experience higher data rates, improved throughput, and improved spectral efficiency Aspects of the disclosure are initially described in the context of wireless communications systems. Aspects of the disclosure are further described by a process flow and a timeline. Aspects of the disclosure are further illustrated by and described with reference to apparatus diagrams, system diagrams, and flowcharts that relate to uplink channel state information reporting.

Figure 1:
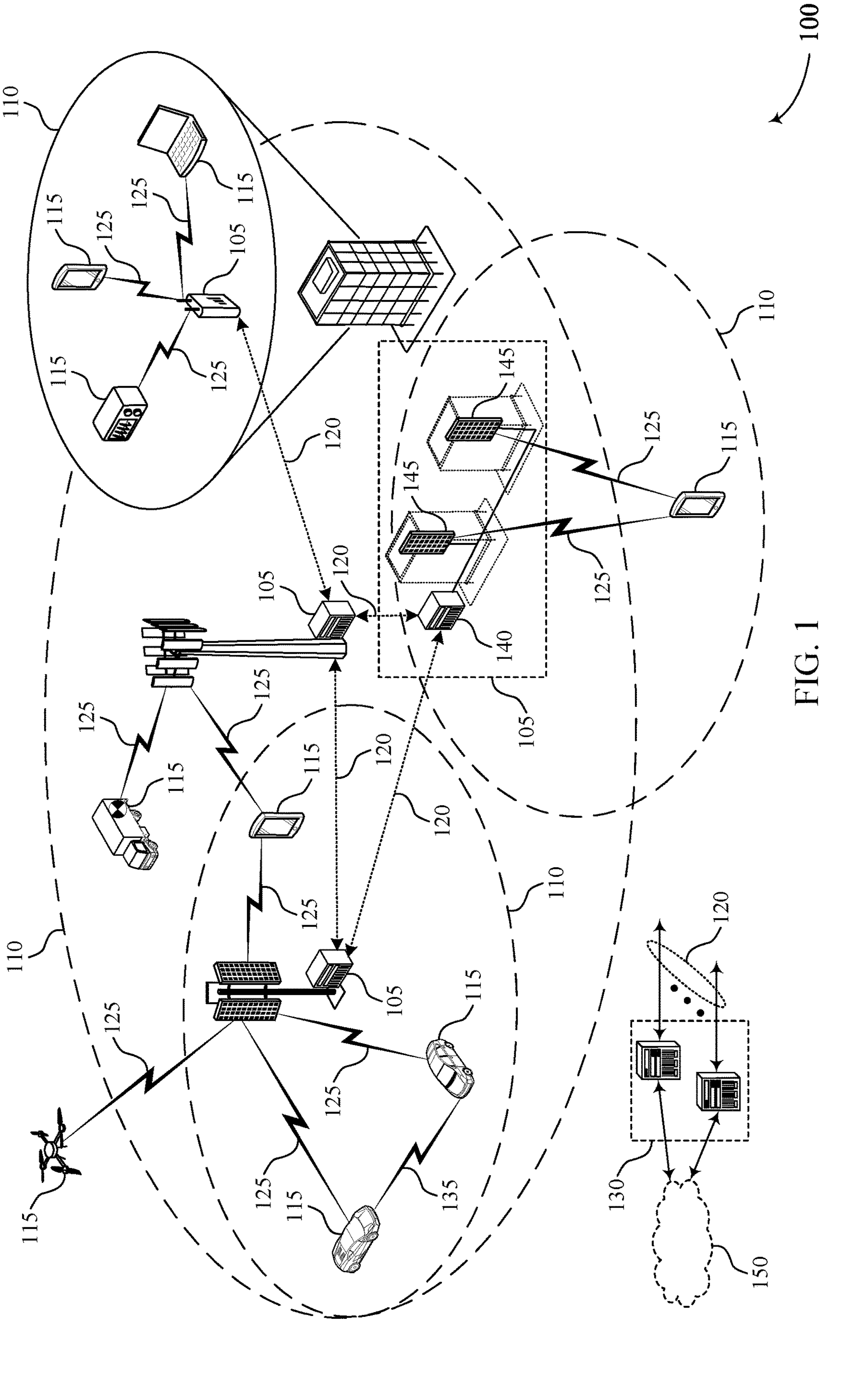
FIG. 1 illustrates an example of a wireless communications system that supports uplink channel state information reporting in accordance with aspects of the present disclosure.

FIG. 1 illustrates an example of a wireless communications system 100 that supports uplink channel state information reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the UE 115 and the base station 105 may utilize complementary measurements and reporting to increase data rates, data capacities, and spectral efficiency. For example, the UE 115 may determine a suggested TPMI and provide it to the base station 105. For example, the UE 115 may receive CSI-RSs, and may perform measurements on the CSI-RSs. The UE 115 may transmit an uplink CSI report to the base station 105 based on the measurements. The CSI report may include an indication of a set of one or more candidate TPMIs, rank indicators (RIs), or both. The base station 105 may test the candidate TPMIs, one or more other TPMIs, or both, to received SRSs (e.g., previously received SRSs, or newly received SRSs), and select a TPMI for subsequent uplink signaling. The base station 105 may then transmit an uplink grant (e.g., via DCI) to the UE 115 indicating the selected TPMI. The DCI may be a single-stage DCI indicating a TPMI that is one of the candidate TPMIs. Or the DCI may be a timeline, where the first-stage DCI may indicate whether the TPMI is from the set of candidate TPMIs or not, and the second-stage DCI may indicate the actual TPMI.

Figure 2:
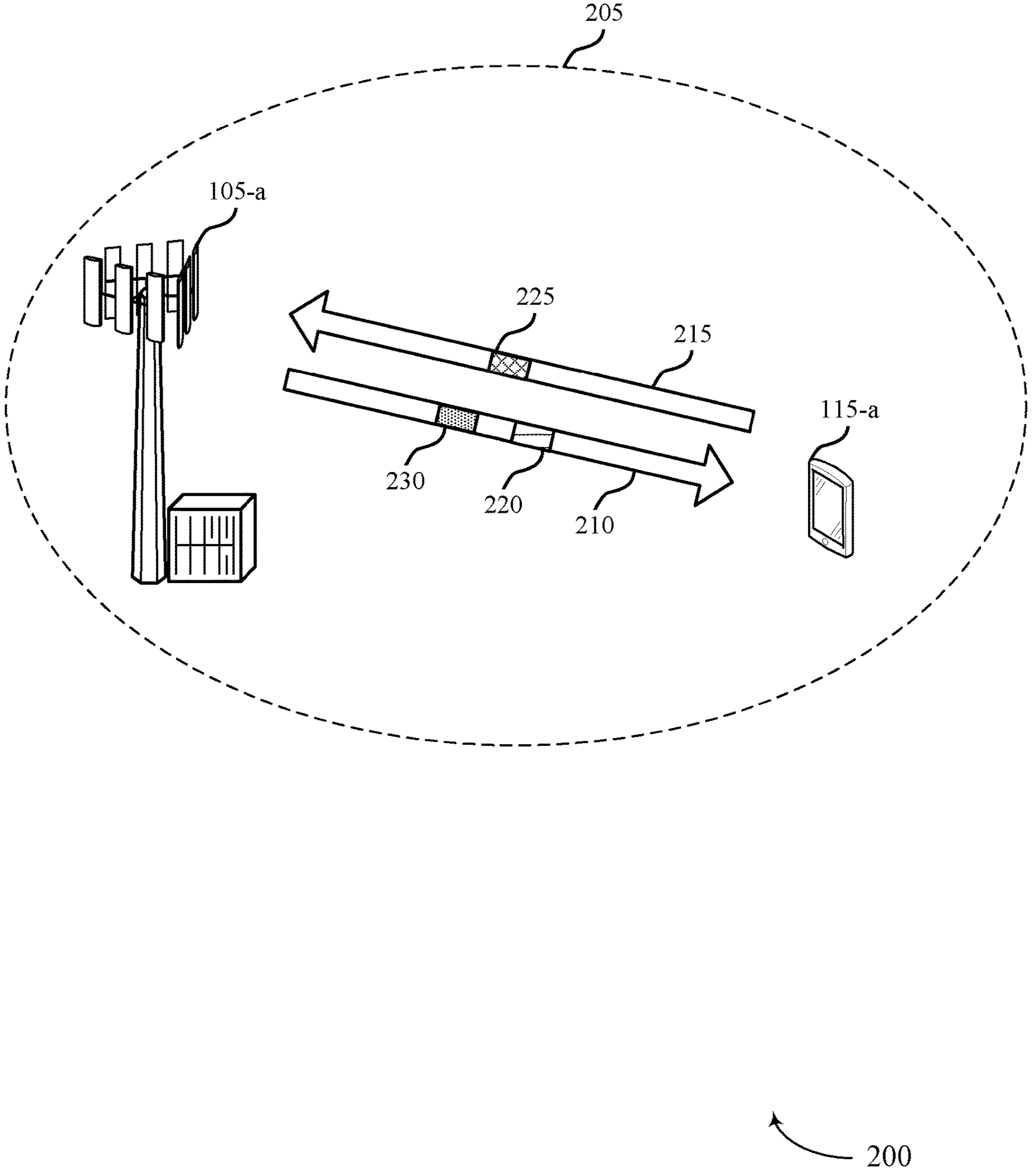
FIG. 2 illustrates an example of a wireless communications system that supports uplink channel state information reporting in accordance with aspects of the present disclosure.

FIG. 2 illustrates an example of a wireless communications system 200 that supports uplink channel state information reporting in accordance with aspects of the present disclosure. The wireless communications system 200 may include a UE 115-*a* and a base station 105-*a*, which may be examples of a UE 115 and a base station 105 as described with reference to FIG. 1. Additionally, the UE 115-*a* may operate within a geographic coverage area 205 corresponding to the base station 105-*a*. While operations and techniques may be discussed below as being performed by particular wireless devices, the operations and techniques may be performed by any number of wireless devices.

The base station 105-*a* and the UE 115-*a* may communicate over a downlink communication link 210 and an uplink communication link 215, where the communications between the base station 105-*a* and the UE 115-*a* may correspond to multiple data streams. For example, the base station 105-*a* may utilize a precoding matrix to determine a number of individual downlink data streams (e.g., a rank associated with downlink) and how individual downlink data streams are mapped to portions of an antenna array at the base station 105-*a* to increase signaling quality. In some cases, the UE 115-*a* may utilize a second precoding matrix to determine how a number of uplink data streams (e.g., a rank associated with the uplink data streams) are mapped to portions of an antenna array at the UE 115-*a* to increase signaling quality.

In some examples, the base station 105-*a* and the UE 115-*a* may perform channel estimation of the downlink communication link 210 and the uplink communication link 215 to further increase signaling quality. The UE 115-*a* may perform channel estimation of the downlink communication link 210 based on one or more reference signals (e.g., CSI-RS) received from the base station 105-*a*. Similarly, the UE 115-*a* may generate and transmit an SRS in many directions (e.g., to increase a relative likelihood that the base station 105-*a* may receive the SRS), which may allow the base station 105-*a* to perform channel estimation of the uplink communication link 215. The base station 105-*a* may receive the SRS and subsequently determine to alter or adapt one or more parameters to increase signaling quality with the UE 115-*a*. For example, the base station 105-*a* may determine a new precoding matrix such that data streams between the UE 115-*a* and the base station 105-*a* experience increased throughput and increased spectral efficiency.

The base station 105-*a* may transmit a precoding matrix indicator (PMI) associated with the new precoding matrix to the UE 115-*a* to increase signaling quality at the UE 115-*a* (e.g., by increasing a signal-to-noise ratio corresponding to the downlink communication link 210). However, by determining a precoding matrix for the UE 115-*a* at the base station 105-*a*, resource consumption at the base station 105-*a* may increase while increasing latency associated with communications over the downlink communication link 210 and the uplink communication link 215. Additionally, transmitting SRS in many directions may consume non-trivial power resources at the UE 115-*a*, and may lead to interference at other devices (e.g., due to the many directions in which the SRS may be transmitted).

In some cases, such as those described in the present disclosure, the wireless communications system 200 may utilize techniques for uplink CSI reporting that supports TPMI selection at the base station 105-*a*. The UE 115-*a* may transmit uplink CSI reporting indicating a set of TPMIs (e.g., candidate TPMIs), a set of candidate rank indicators (RIs), or both, to the base station 105-*a*. In such examples, the base station 105-*a* may determine to utilize a TPMI from the candidate TPMIs indicated by the UE 115-*a*, or another TPMI (e.g., that is not included in the set of candidate TPMIs).

For example, the base station 105-*a* may transmit a CSI-RS 220 over the downlink communication link 210 to the UE 115-*a*. The UE 115-*a* may receive the CSI-RS 220 and perform channel estimation (e.g., estimate an uplink precoder, a rank associated with the downlink communication link 210, or the like) of the downlink communication link 210 based on the CSI-RS 220. In some examples, such as those described in the present disclosure, the UE 115-*a* may leverage channel reciprocity to also estimate the uplink communication link 215 (e.g., based at least in part on the measurements performed on the CSI-RSs 220).

The UE 115-*a* may use the CSI-RS 220 to measure which uplink precoding matrix (e.g., or matrices) may be considered as candidate TPMIs. For example, the UE 115-*a* may determine that one or more TPMIs may increase data capacity, data rates, and spectral efficiency in the wireless communications system 200 (e.g., may satisfy a channel measurement threshold). Based on the determination, the UE 115-*a* may transmit an uplink CSI report 225 to the base station 105-*a*. The uplink CSI report may correspond to a subband or wideband transmission. Additionally, the uplink CSI report 225 may include the set of one or more candidate TPMIs, a set of one or more candidate RIs, or the like. Additionally, the uplink CSI report 225 may include an indication of a downlink reference signal for channel measurement (e.g., assuming channel reciprocity). Additionally or alternatively, the UE 115-*a* may transmit an SRS (e.g., on a new resource corresponding to the candidate TPMIs included in the uplink CSI report 225), where the UE 115-*a* reports candidate TPMIs assumed to be applied to SRS ports.

Based on the uplink CSI report 225, the base station 105-*a* may determine a TPMI to utilize for communications with the UE 115-*a*. In some examples, the base station 105-*a* may select one of the candidate TPMIs. In some examples, the base station 105-*a* may select a non-candidate TPMI. The candidate TPMIs may be spatially correlated to one or more beams carrying SRSs (e.g., SRSs on SRS resources for testing candidate or non-candidate TPMIs), which may further assist the base station 105-*a* in determining which candidate TPMI or non-candidate TPMI to implement. For example, the base station 105-*a* may test one or more of the candidate TPMIs on SRS resources, or may test other TPMIs (e.g., TPMIs that are spatially correlated to the beams associated with the candidate TPMIs), or the like. In some examples, the base station 105-*a* may utilize a previously received SRS on a previously allocated SRS resource for testing. In some examples, the base station may utilize SRSs received on new or designated SRS resources for testing.

The base station 105-*a* may transmit an uplink grant 230 to the UE 115-*a*, where the uplink grant 230 indicates the determined TPMI. The UE 115-*a* may utilize the indicated TPMI to perform uplink communications over the uplink communication link 215. Thus, as described herein, an uplink CSI report may include an indication of a downlink reference signal for channel measurement assuming reciprocity, and an uplink SRS resource. The UE may report, in such a CSI report, one or more uplink PMI candidates which are assumed to be applied to the SRS ports.

In some examples, the base station 105-*a* may leverage channel reciprocity to configure both CSI-RS-based TPMI selection and SRS-based TPMI selection in a complementary manner to cover different parts of a BWP, resource block (RB) allocations within the BWP, or the like (e.g., assuming a same BWP for downlink and uplink). For example, a base station 105-*a* may configure SRSs (e.g., for measurements by the base station 105-*a*) and CSI-RSs (e.g., for measurements by the UE 115-*a*) in a complementary manner to cover different parts of a BW, different RB allocations within a same BWP, or the like (e.g., assuming the same BWP for downlink and uplink). Thus, measurement and reporting may be performed in a complimentary manner. In particular, for physical uplink shared channel (PUSCH) scheduling, the UE 115-*a* may transmit SRS (e.g., for the base station 105-*a* to measure, based on which the bae station 105-*a* may determine a TPMI) in one BWP or one part of the BWP, while the UE 115-*a* may also receive CSI-RSs and report candidate TPMIs for other BWPs or other parts of the BW for PUSCH based on the downlink CSI-RSs. By allowing the UE 115-*a* to determine candidate TPMIs efficiency and accuracy associated with channel sounding and channel estimation may be increased. Additionally, if the UE 115-*a* is power limited (e.g., for SRS transmissions), or when uplink BWP switching is performed (e.g., SRS in BWP 1, CSI-RS in BWP 2), aspects of the present disclosure provide an efficient scheme to perform accurate channel estimation while also conserving power resources at the UE 115-*a*.

By utilizing the above techniques, one or more aspects of the wireless communications system 200 may be improved. For example, CSI-RS may have higher power than SRS (e.g., especially for UEs at cell-edge), which may save power at the UE 115-*a* (e.g., because the TPMI may be selected by receiving CSI-RSs, instead of transmitting SRSs frequently with multiple candidate TPMIs). Additionally, the UE 115-*a* may avoid transmitting SRSs in unwanted directions (e.g., and causing interference) because the UE 115-*a* utilizes precoded SRS to the base station 105-*a* and the base station 105-*a* may select an SRS resource indicator (SRI), which may decrease occurrences of interference experienced at surrounding wireless devices.

Figure 3:
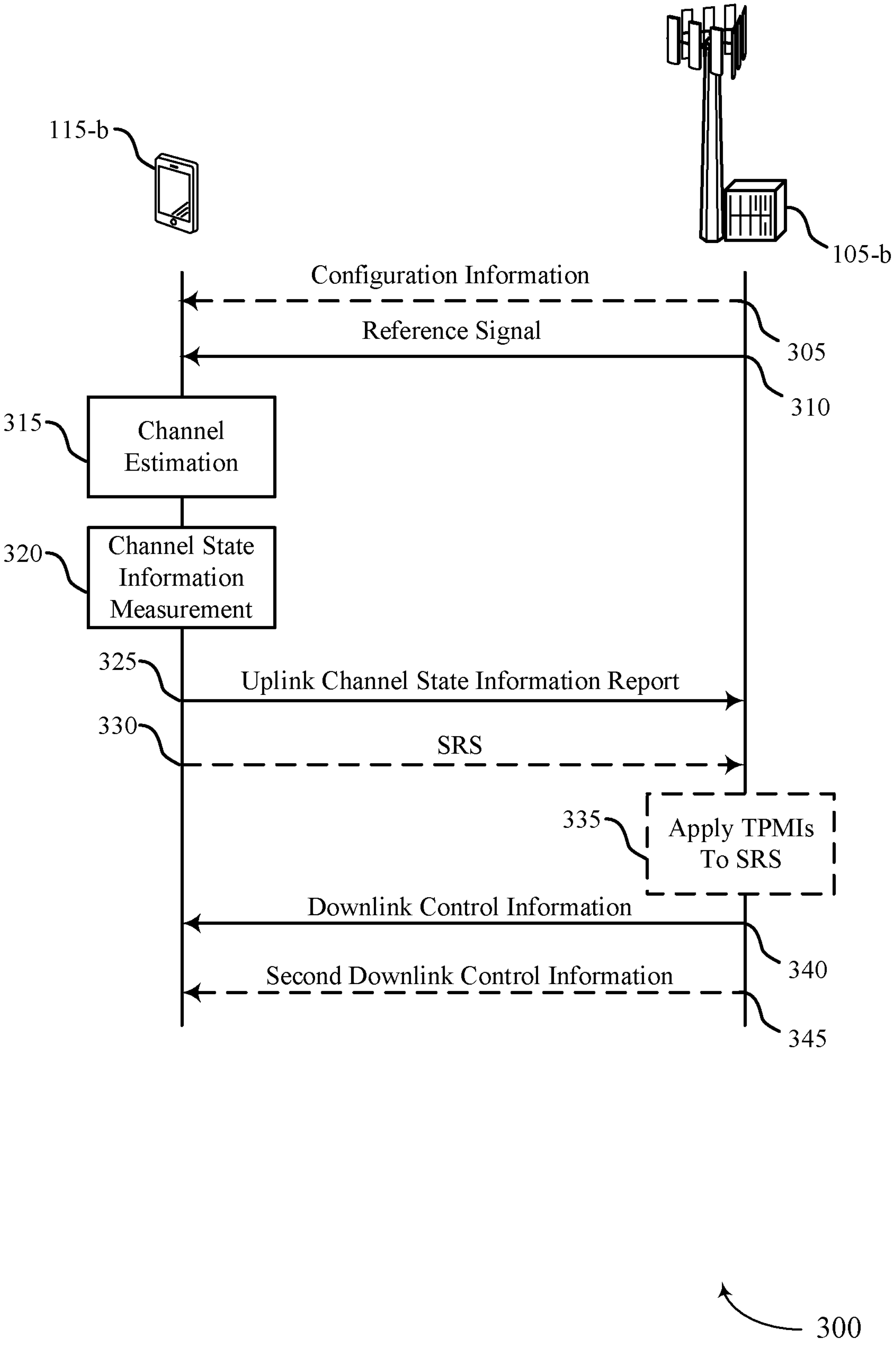
FIG. 3 illustrates an example of a process flow that supports uplink channel state information reporting in accordance with aspects of the present disclosure.

FIG. 3 illustrates an example of a process flow 300 that supports uplink channel state information reporting in accordance with aspects of the present disclosure. The process flow 300 may be utilized by one or more wireless devices, such as a base station 105-*b* and a UE 115-*b*, which may be examples of a base station 105 and a UE 115 as described with reference to FIG. 1. In some examples, the process flow 300 may include one or more operations, signals, and procedures associated with one or more UEs which may be examples of those discussed with reference to FIG. 2. While specific operations and techniques are discussed below, the operations and techniques may be performed in a different order than the example order shown, or the operations performed by the devices may be performed by different devices or at different times.

At 310, the base station 105-*b* may transmit a reference signal to the UE 115-*b* using a first set of ports. For example, the base station 105-*b* may transmit one or more CSI-RSs to the UE 115-*b*, and the UE 115-*b* may perform channel estimation based on the one or more CSI-RSs at 315. For instance, the UE 115-*b* may perform one or more channel measurements (e.g., may measure reference signal receive power (RSRP), reference signal received quality (RSRQ), received signal strength indicator (RSSI), or the like). In some examples, the first set of ports may be the same set of ports with which the base station 105-*b* will receive uplink signaling (e.g., subsequent to transmitting DCI at 340 or 345), the same set of ports with which the base station 105-*b* will receive SRSs (e.g., at 330), or both.

At 320, based on the channel estimation at 315, the UE 115-*b* may determine one or more candidate TPMIs to transmit to the base station 105-*b* in a CSI report. In some examples, the UE 115-*b* may generate the CSI report based at least in part on configuration information received at 305.

For example, at 305, the base station may transmit, and the UE 115-*b* may receive, configuration information. The configuration information may instruct the UE as to whether the CSI report is to be a wideband CSI report or a subband CSI report. In some examples (e.g., where the CSI report is to be a subband report), the configuration information may include an indication of a subband size for the CSI report. In some examples, the base station 105-*b* may indicate, via the configuration information, a number of best or preferred TPMIs (e.g., L candidate TPMIs per subband or wideband) that the UE 115-*b* may or is instructed to include in the uplink CSI report. Additionally, or alternatively, the configuration information may include one or more channel ranks (e.g., number of layers of each candidate TPMI) that the UE 115-*b* is instructed to include in the CSI report. In some cases, the configuration information may instruct the UE 115-*b* to indicate candidate TPMIs, RIs, or both, per resource, per resource set, or per CSI report configuration, or any combination thereof. In some examples, the configuration information may instruct the UE 115-*b* to include an indication of signaling TPMIs, or RIs, without including a channel quality indicator (CQI) as a response to CSI-RS. The instructions to indicate the number of TPMIs or RIs or both (e.g., and to omit CQI from the CSI report) may be per resource, per resource set, or per CSI report configuration, or any combination thereof. The base station 105-*b* may also configure multiple CSI-RS resources with TPMI applied to SRS ports, where the UE 115-*b* may report a number of best channel resource indicators (CRIs) to the base station 105-*b*.

The configuration information may be included in higher layer signaling (e.g., a radio resource control (RCC) message), a medium access control (MAC) control element (CE), or both. In some cases, the configuration information may coincide with (e.g., may be performed as part of) CSI-RS configuration per CSI-RS resource or resource set, CSI-RS reporting configuration, or the like.

The UE 115-*b* may generate the CSI report according to the configuration information received at 305. For instance, the number of candidate TPMIs determined by the UE 115-*a* may correspond to the number of candidate TPMIs indicated by the configuration information received at 305, the report may be a subband report or a wideband report based on the configuration information, etc. In some examples, the CSI report may be configured per resource, per resource set, or per CSI report configuration, or any combination thereof. In some examples, as described herein with reference to the configuration information, the UE 115-*b* may indicate the candidate TPMIs or RIs by including an indication of a set of one or more preferred CRIs in the CSI report.

At 325, the UE 115-*a* may transmit the uplink CSI report to the base station 105-*b* indicating the candidate TPMIs determined based on the CSI-RS at 310 and governed by the configuration information received at 305. In some examples, the uplink CSI report may include an indication of one or more CSI resource indicators (CRI) (e.g., indicating the candidate TPMIs associated with the CRIs). For example, the base station 105-*b* may configure multiple CSI-RS resources with PMI applied to SRS ports, and the UE 115 may report a number (e.g., L) of preferred or best CRIs. Thus, when the UE 115-*b* reports a CRI (e.g., indicating a best CSI-RS resource), the uplink PMI may be based on the CSI-RS indicated by the CRI. The base station may receive the uplink CSI report using the first set of ports corresponding to the CSI-RSs transmitted at 310. Once the base station receives the uplink CSI report, the candidate TPMIs may be determined by the base station based on the CSI-RS indicated by the CRI. The UE 115-*b* may assume the base station 105-*b* uses the same spatial domain transmission filter for transmitting the reference signal (e.g., CSI-RSs) at 310 and for receiving uplink transmissions over a PUSCH precoded with the reported (e.g., candidate) uplink PMI. Additionally, the uplink PMI (e.g., candidate TPMIs) may be determined or conditioned based on a reported RI.

The base station 105-*b* may perform one or more processing techniques to determine a TPMI to indicate to the UE 115-*b* for subsequent uplink signaling by the UE 115-*b*. For example, the base station 105-*b* may apply an uplink precoding candidate (e.g., a candidate TPMI, or one or more additional TPMIs, or the like) to an SRS port (e.g., the same SRS ports used to transmit CSI-RSs at 310, to received SRSs at 330, or both). The base station may rely on previously received SRS resources, or may rely on new SRS resources. For example, the UE 115-*b* may transmit SRSs on previously configured SRS resources known to the base station 105-*b*, or may transmit the SRS (e.g., at 330) on SRS resources designated for TPMI testing, or any other SRS resource. The UE 115-*b* may transmit the SRSs using SRS ports that are the same set of ports the UE 115-*b* may use for transmitting uplink signaling on a PUSCH.

At 340, the base station may transmit DCI to the UE 115-*b*. The DCI may include an indication (e.g., an index) corresponding to the TPMI chosen by the base station 105-*b*. Alternatively, the DCI may be a first-stage DCI (e.g., transmitted at 340) including an indication of whether the base station 105-*b* selected the TPMI from the candidate TPMIs indicated by the UE 115-*b*, or if the base station 105-*b* chose a different TPMI not included in the candidate TPMIs. In such examples, at 345, the base station 105-*b* may transmit a second-stage DCI to the UE 115-*b*. The second-stage DCI may depend on information indicated in the first-stage DCI, and may further indicate a payload size associated with a chosen TPMI. Based on the chosen TPMI, the UE 115-*b* may perform subsequent communications with the base station 105-*b* according to the chosen TPMI.

In some examples, the UE 115-*b* may be capable of receiving the DCI according to one or more modes. For example, if operating according to a first mode (e.g., Mode 1), the UE 115-*b* may assume that the base station 105-*b* will select the TPMI from the set of candidate TPMIs indicated in the CSI report. If operating in a second mode (e.g., mode 2), the UE may determine that the base station may select the TPMI from the set of candidate TPMIS or may select a different TPMI that is not a candidate TPMI. In such examples, the base station may indicate the TPMI via timeline signaling, as described in greater detail with reference to FIG. 4.

In some examples, the base station 105-*b* may indicate, to the UE 115-*b*, which mode in which to operate. For instance, at 305, the base station 105-*b* may transmit a mode indication (e.g., in the configuration information, or in a separate message). The mode indication may characterize how the base station 105-*b* selects a TPMI for communications with the UE 115-*b*. For example, the base station 105-*b* may have two options after receiving the candidate TPMIs from the UE 115-*b*. Option one may correspond to choosing TPMIs indicated by the UE 115-*b* (e.g., choosing a TPMI from the candidate TPMIs in Mode 1). Option two may correspond to choosing a different TPMI than those indicated within the candidate TPMIs (e.g., Mode 2). The mode indication at 305 may indicate which options may be available to the base station 105-*b*, which may correspond to different signaling arrangement based on which mode the base station 105-*b* utilizes. For example, the base station 105-*b* may indicate Mode 1. Mode 1 may correspond to the base station 105-*b* selecting a TPMI from the candidate TPMIs suggested from by the UE 115-*b*. In some examples, Mode 1 may indicate to the UE 115-*b* a payload size associated with a DCI (e.g., DCI may have $\log_2$ (N) where N is a number of candidate TPMIs suggested by the UE 115-*b*). Alternatively, Mode 2 may indicate that the base station 105-*b* may select a TPMI from the candidate TPMIs or some new TPMI not suggested by the UE 115-*b*. The base station 105-*b* may indicate the TPMI via single-stage DCI or timeline (e.g., depending on whether the UE 115-*b* and the base station 105-*b* are operating according to Mode 1 or Mode 2). Timeline signaling (e.g., according to mode 2) is described in greater detail with reference to FIG. 4.

Figure 4:
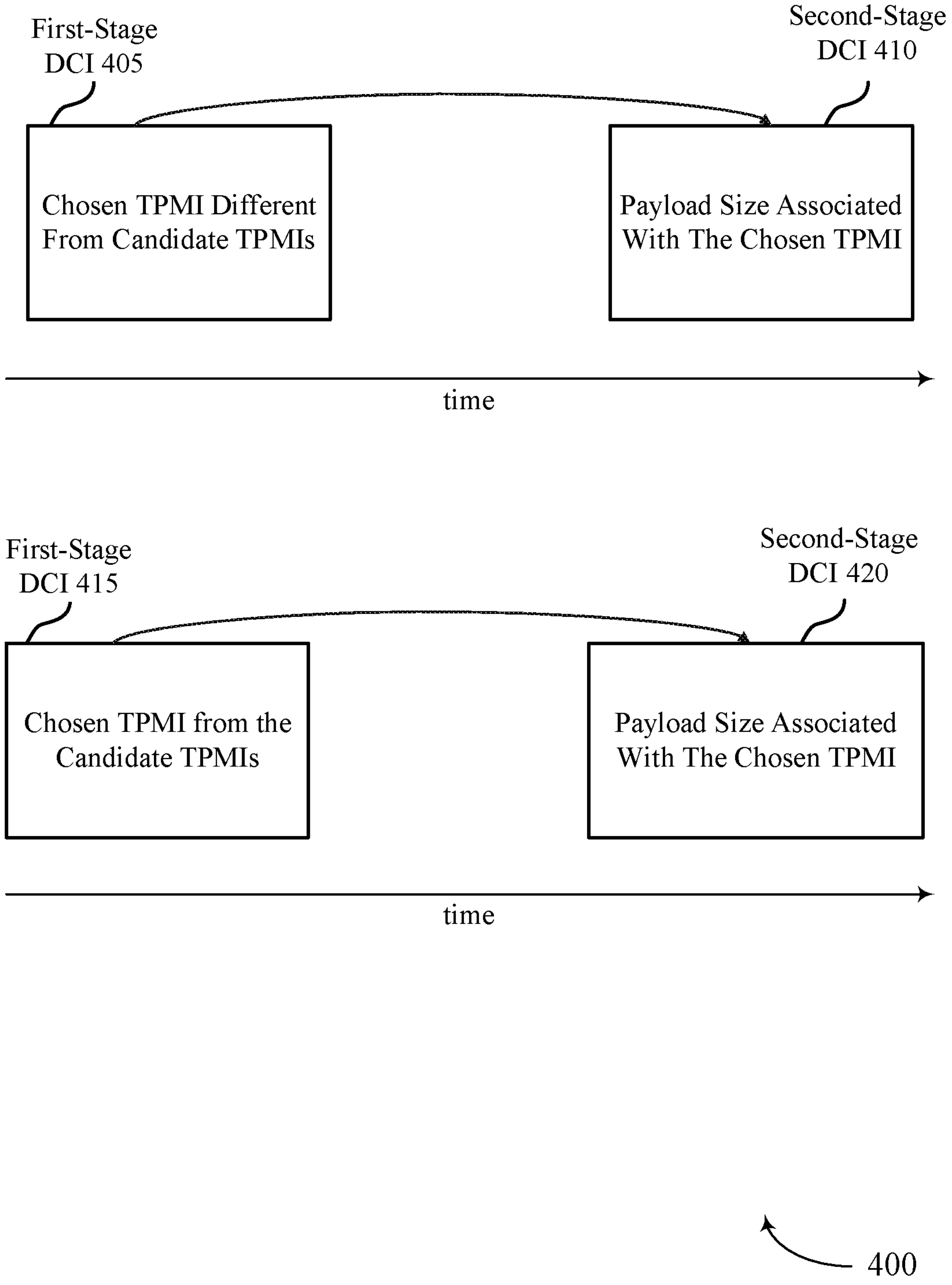
FIG. 4 illustrates an example of a timeline that supports uplink channel state information reporting in accordance with aspects of the present disclosure.

FIG. 4 illustrates an example of a timeline 400 that supports uplink channel state information reporting in accordance with aspects of the present disclosure. The timeline 400 may be performed by one or more wireless devices, such as a base station and a UE, which may be examples of a base station 105 and a UE 115 as described with reference to FIG. 1. In some examples, the timeline 400 may include one or more operations, signals, and procedures associated with the UE and base station, which may be examples of those discussed with reference to FIGS. 2 and 3. While specific operations and techniques are discussed below, the operations and techniques may be performed in a different order than the example order shown, or the operations performed by the devices may be performed by different devices or at different times.

As described with reference to FIG. 3, the UE and the base station may operate according to one or more modes (e.g., Mode 1 or Mode 2). The modes may be configured in one or more standards documents, preconfigured at the UE, or indicated by the base station. In some examples, the UE and the base station may be configured to operate according to only one mode (e.g., Mode 1 or Mode 2), and the devices may not switch between the two modes. In some examples, the base station may indicate a mode of operation to the UE (e.g., may switch between Mode 1 and Mode 2 based on one or more rules, or based on one or more conditions being satisfied, based on base station determination, or the like). The modes may be triggered by an RRC message, a MAC-CE message, DCI signaling, or any combination thereof. For example, an indication of Mode 1 may trigger the UE to monitor for and receive a single DCI message indicating an index corresponding to a candidate TPMI. That is, Mode 1 may inform the UE that the TPMI to be indicated by the base station corresponds to a candidate TPMI that was suggested by the UE. This may result in a smaller payload in the DCI signaling, resulting in more available resources for wireless communications, increased throughput, decreased latency, or the like.

In some examples, the UE may operate according to Mode 2 (e.g., the base station may indicate mode 2). When operating in Mode 2, the base station may choose either a TPMI from the candidate TPMIs indicated by the UE or a new TPMI that does not correspond to the candidate TPMIs indicated by the UE. In such cases, the base station may utilize a timeline to inform the UE of the TPMI (e.g., and an associated payload size of the TPMI). For example, the base station may send a first-stage DCI, which may correspond to a one bit indication indicating whether the base station chose the TPMI from the candidate TPMIs reported by the UE. The base station may follow the first-stage DCI with a second-stage DCI, indicating a payload size corresponding to the chosen TPMI.

The base station may operate according to mode 2. For example, the UE may be preconfigured to operate according to mode 2, or the UE may receive an indication of mode 2 over RRC, MAC-CE, or both. Based on the indication of mode 2, the UE may receive a first-stage DCI 405. The first-stage DCI 405 may indicate that the base station chose a TPMI that is different from candidate TPMIs reported by the UE. Additionally, the first-stage DCI 405 may include time and frequency resources for a second-stage DCI 410 (e.g., where the second-stage DCI 410 includes an indication of the chosen TPMI) so that the UE may not have to search for the second-stage DCI 410. The UE may then receive the second-stage DCI 410 from the base station. In some examples, the second-stage DCI 410 may also include an indication of a payload size (e.g., a number of bits (e.g., K bits) associated with the chosen TPMI). In some examples, K may be greater than $\log_2$ (N) (e.g., in cases of subband based TPMI). The second-stage DCI 410 may be indicated on a single resource with different OFDM symbols or different RBs, or may be distributed over different resources in different slots. Based on the first-stage DCI 405 and the second-stage DCI 410, the UE may implement the indicated TPMI for future communications with the base station.

In some examples, the UE may receive a first-stage DCI 415 indicating that the base station chose a TPMI from the candidate TPMIs reported by the UE. In some examples, the first-stage DCI 415 may further include an indication of time and frequency resources for receiving a second-stage DCI 420. The UE may receive a second-stage DCI 420 indicating the TPMI. The indication of the TPMI in second-stage DCI 420 may be a number of bits (e.g., $\log_2$ (N) bits, where N may correspond to the number of candidate TPMIs reported by the UE). The second-stage DCI 420 may indicate the number of bits (e.g., $\log_2$ (N) bits), or the UE may assume the number of bits based on the indication in first-stage DCI 415 that the TPMI is chosen from the indicated set of candidate bits. In some examples, $\log_2$ (N) may be less than K, where a difference between $\log_2$ (N) and K may be large (e.g., in subband-based TPMI).

Based on the timeline 400, the UE may continue communications with the base station based on the indicated TPMI. For example, the UE may transmit uplink signaling to the base station according to the indicated TPMI (e.g., indicated in the second-stage DCI 420). In some cases, the base station and the UE may perform communication operations according to the indicated TPMI. In other cases, the UE may receive a second timeline indicating a new TPMI to utilize for subsequent communications.

Figure 5:
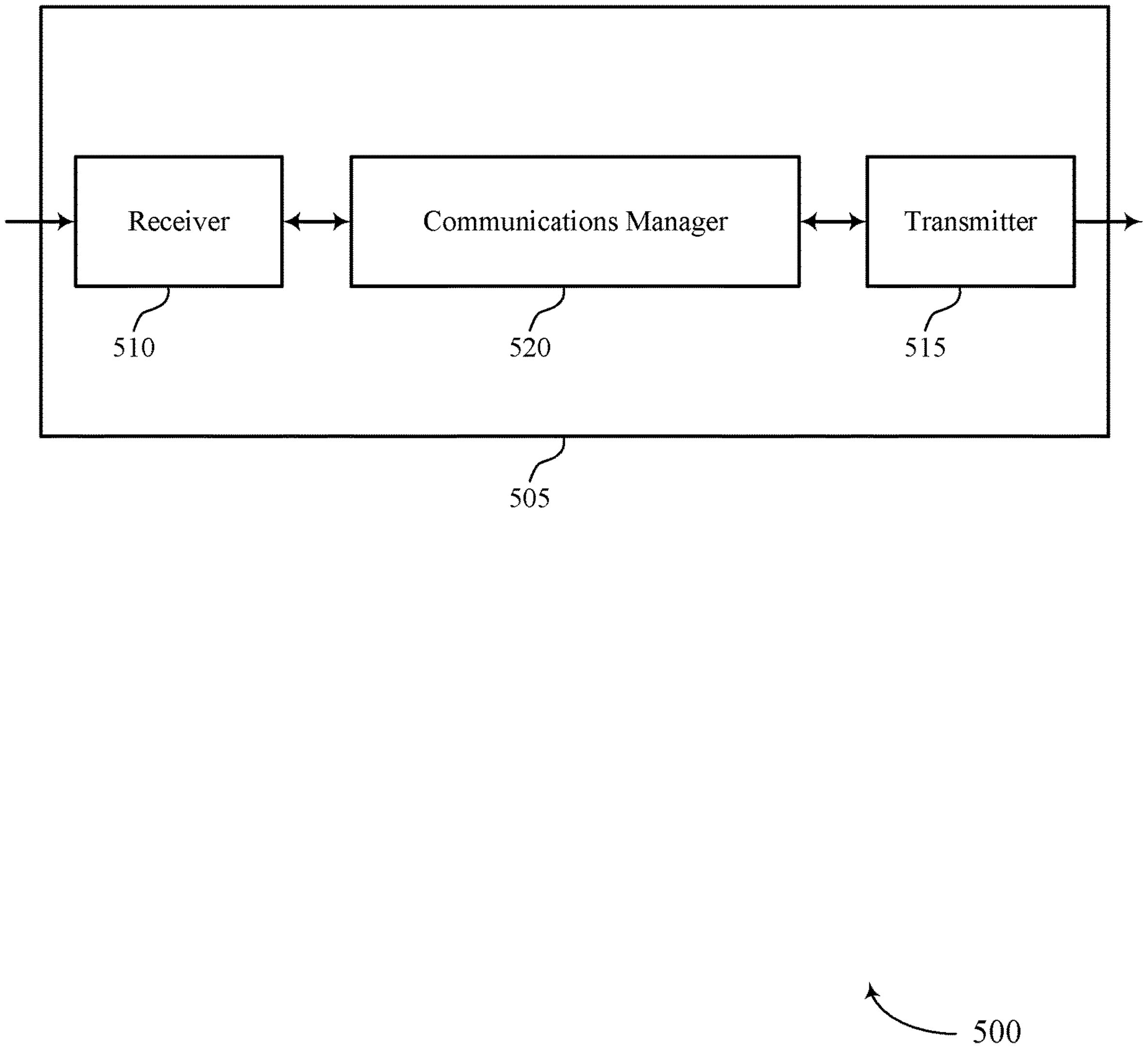
FIGS. 5 and 6 show block diagrams of devices that support uplink channel state information reporting in accordance with aspects of the present disclosure.

FIG. 5 shows a block diagram 500 of a device 505 that supports uplink CSI reporting in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink CSI reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink CSI reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink CSI reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, one or more CSI-RSs. The communications manager 520 may be configured as or otherwise support a means for performing one or more CSI measurements on the one or more CSI-RSs. The communications manager 520 may be configured as or otherwise support a means for transmitting, to the base station, an uplink CSI report including a set of candidate TPMIs, a set of candidate rank indicators, or a combination thereof based on the one or more CSI measurements. The communications manager 520 may be configured as or otherwise support a means for receiving, from the base station and in response to transmission of the uplink CSI report, DCI including an indication of a TPMI to be used by the UE for uplink signaling.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources by performing complementary measurements and reporting for channel estimation and channel sounding.

Figure 6:
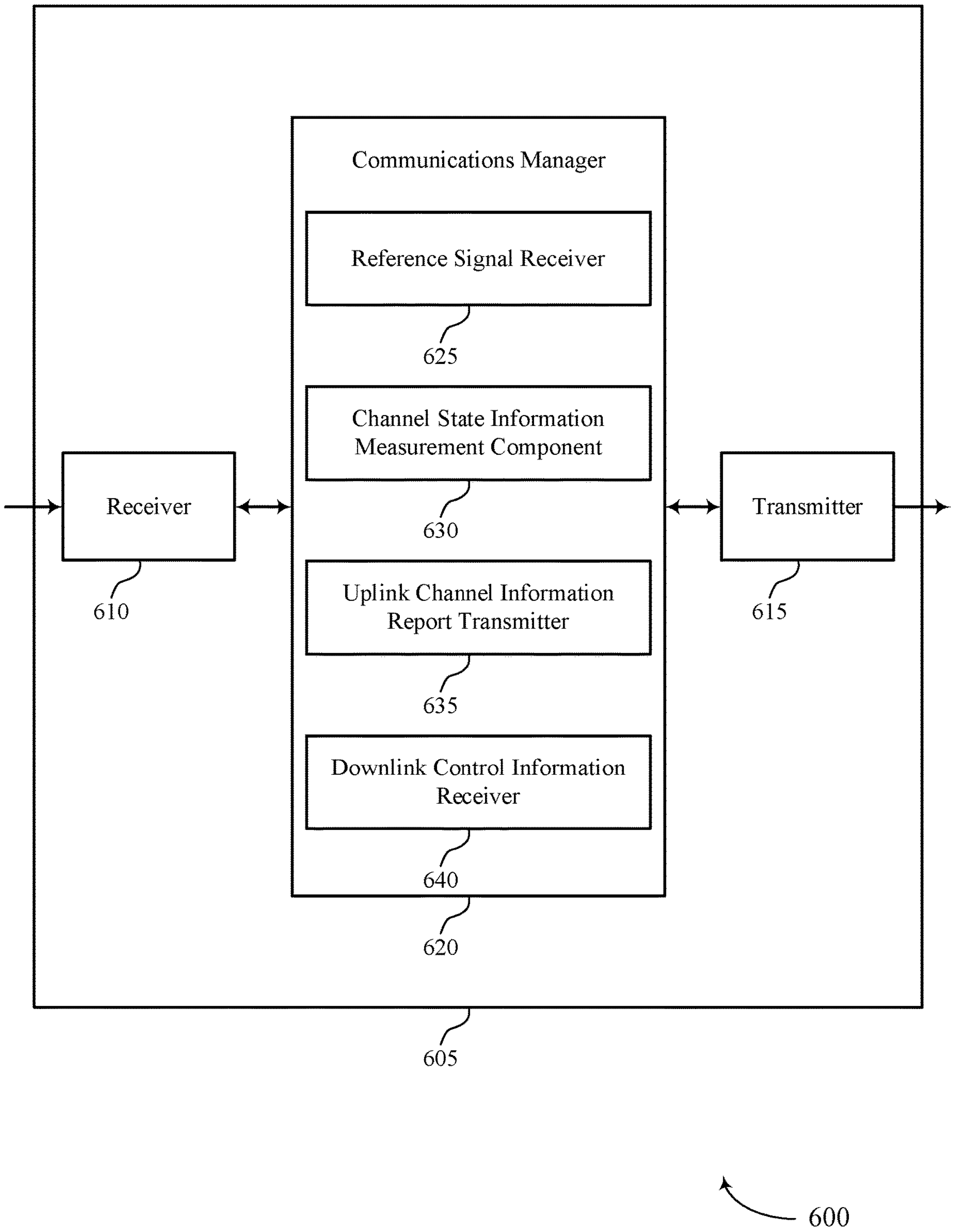

FIG. 6 shows a block diagram 600 of a device 605 that supports uplink CSI reporting in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink CSI reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink CSI reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink CSI reporting as described herein. For example, the communications manager 620 may include a reference signal receiver 625, a CSI measurement component 630, an uplink channel information report transmitter 635, a DCI receiver 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The reference signal receiver 625 may be configured as or otherwise support a means for receiving, from a base station, one or more CSI-RSs. The CSI measurement component 630 may be configured as or otherwise support a means for performing one or more CSI measurements on the one or more CSI-RSs. The uplink channel information report transmitter 635 may be configured as or otherwise support a means for transmitting, to the base station, an uplink CSI report including a set of candidate TPMIs, a set of candidate rank indicators, or a combination thereof based on the one or more CSI measurements. The DCI receiver 640 may be configured as or otherwise support a means for receiving, from the base station and in response to transmission of the uplink CSI report, DCI including an indication of a TPMI to be used by the UE for uplink signaling.

Figure 7:
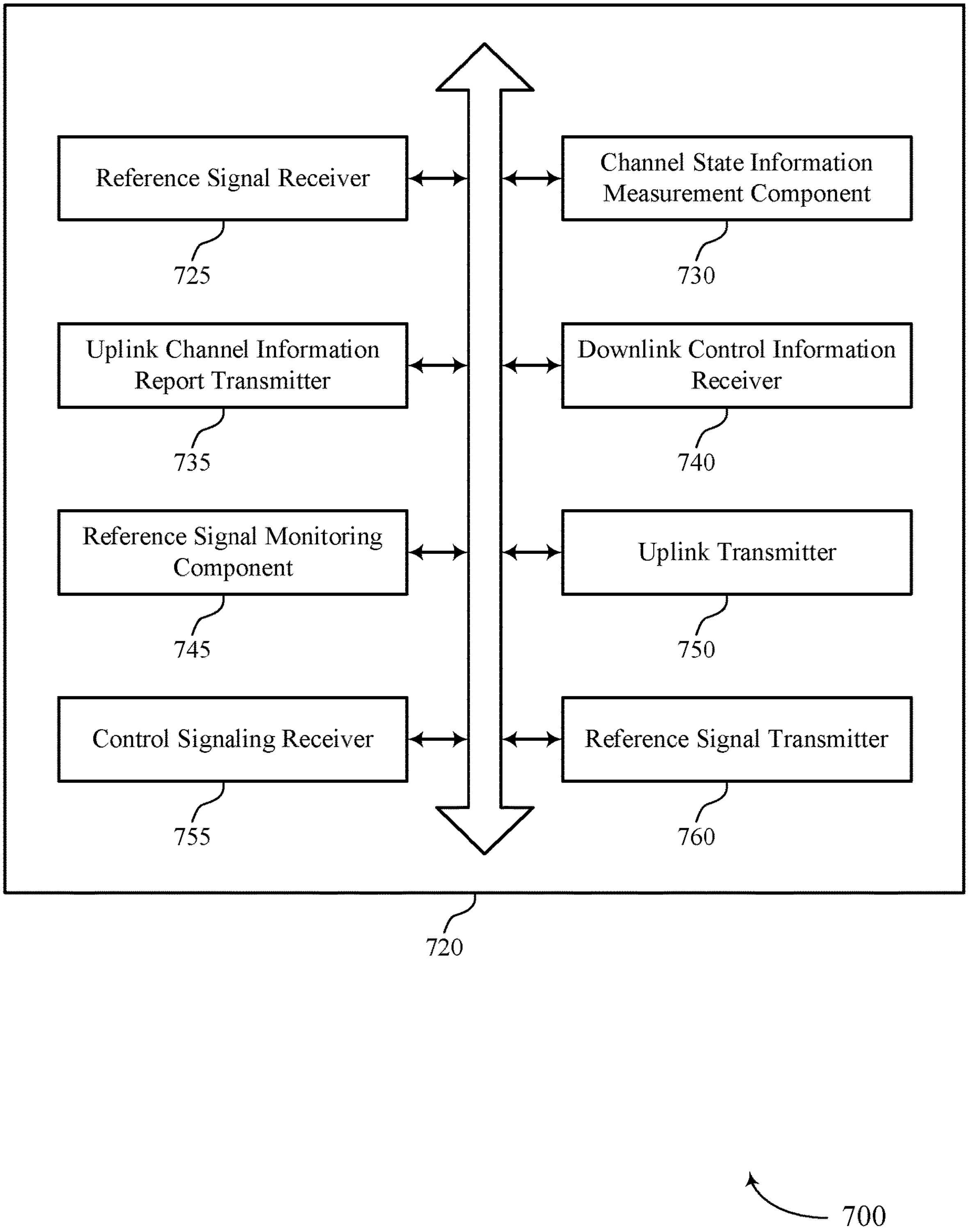
FIG. 7 shows a block diagram of a communications manager that supports uplink channel state information reporting in accordance with aspects of the present disclosure.

FIG. 7 shows a block diagram 700 of a communications manager 720 that supports uplink CSI reporting in accordance with aspects of the present disclosure. The communications manager 720 may be an example of aspects of a communications manager 520, a communications manager 620, or both, as described herein. The communications manager 720, or various components thereof, may be an example of means for performing various aspects of uplink CSI reporting as described herein. For example, the communications manager 720 may include a reference signal receiver 725, a CSI measurement component 730, an uplink channel information report transmitter 735, a DCI receiver 740, a reference signal monitoring component 745, an uplink transmitter 750, a control signaling receiver 755, a reference signal transmitter 760, or any combination thereof. Each of these components may communicate, directly or indirectly, with one another (e.g., via one or more buses).

The communications manager 720 may support wireless communications at a UE in accordance with examples as disclosed herein. The reference signal receiver 725 may be configured as or otherwise support a means for receiving, from a base station, one or more CSI-RSs. The CSI measurement component 730 may be configured as or otherwise support a means for performing one or more CSI measurements on the one or more CSI-RSs. The uplink channel information report transmitter 735 may be configured as or otherwise support a means for transmitting, to the base station, an uplink CSI report including a set of candidate TPMIs, a set of candidate rank indicators, or a combination thereof based on the one or more CSI measurements. The DCI receiver 740 may be configured as or otherwise support a means for receiving, from the base station and in response to transmission of the uplink CSI report, DCI including an indication of a TPMI to be used by the UE for uplink signaling.

In some examples, the reference signal monitoring component 745 may be configured as or otherwise support a means for monitoring for the one or more CSI-RSs using a first set of ports, where receiving the one or more CSI-RSs is based on the monitoring. In some examples, the uplink transmitter 750 may be configured as or otherwise support a means for transmitting, to the base station, uplink signaling using the indicated TPMI for uplink signaling on a physical uplink shared channel using the first set of ports.

In some examples, to support transmitting the uplink CSI report, the uplink channel information report transmitter 735 may be configured as or otherwise support a means for transmitting, in the uplink CSI report, an indication of a set of channel resource indicators, each channel resource indicator of the set of channel resource indicators associated with a candidate TPMI of the set of candidate TPMIs.

In some examples, the control signaling receiver 755 may be configured as or otherwise support a means for receiving, from the base station, control signaling including an indication of a number of candidate TPMIs in the set of candidate TPMIs, a number of RIs to include in the uplink CSI report, a wideband reporting mode, a subband reporting mode, or any combination thereof.

In some examples, to support receiving the control signaling, the control signaling receiver 755 may be configured as or otherwise support a means for receiving the control signaling during a CSI-RS configuration procedure.

In some examples, the control signaling includes RRC signaling, a MAC-CE, or a combination thereof. In some examples, the control signaling including the indication is associated with a CSI-RS resource, a set of CSI resources, or a combination thereof.

In some examples, to support receiving the DCI, the DCI receiver 740 may be configured as or otherwise support a means for receiving a single-stage DCI message including an index associated with a PMI of the set of candidate PMIs.

In some examples, to support receiving the DCI, the DCI receiver 740 may be configured as or otherwise support a means for receiving a first two-stage DCI message indicating that the indication of the TPMI for uplink signaling is located in a second two-stage DCI message. In some examples, to support receiving the DCI, the DCI receiver 740 may be configured as or otherwise support a means for receiving the second two-stage DCI message including the indication of the TPMI based on receiving the first two-stage DCI message.

In some examples, the first two-stage downlink control information message may indicate that the TPMI is one of the set of candidate PMIs.

In some examples, the first two-stage downlink control information message may indicate that the TPMI is not one of the set of candidate PMIs.

In some examples, the DCI receiver 740 may be configured as or otherwise support a means for receiving, in the first two-stage DCI message, a set of time and frequency resources on which to receive the second two-stage DCI message.

In some examples, the reference signal transmitter 760 may be configured as or otherwise support a means for transmitting one or more SRSs to the base station on a first set of frequency resources that is different than a second set of frequency resources on which the UE transmits the uplink signaling. In some examples, the DCI receiver 740 may be configured as or otherwise support a means for receiving, from the base station based on transmitting the SRSs, second DCI including a second indication of a second TPMI for uplink signaling on the first set of frequency resources, where the PMI is associated with the uplink signaling on the second set of frequency resources.

Figure 8:
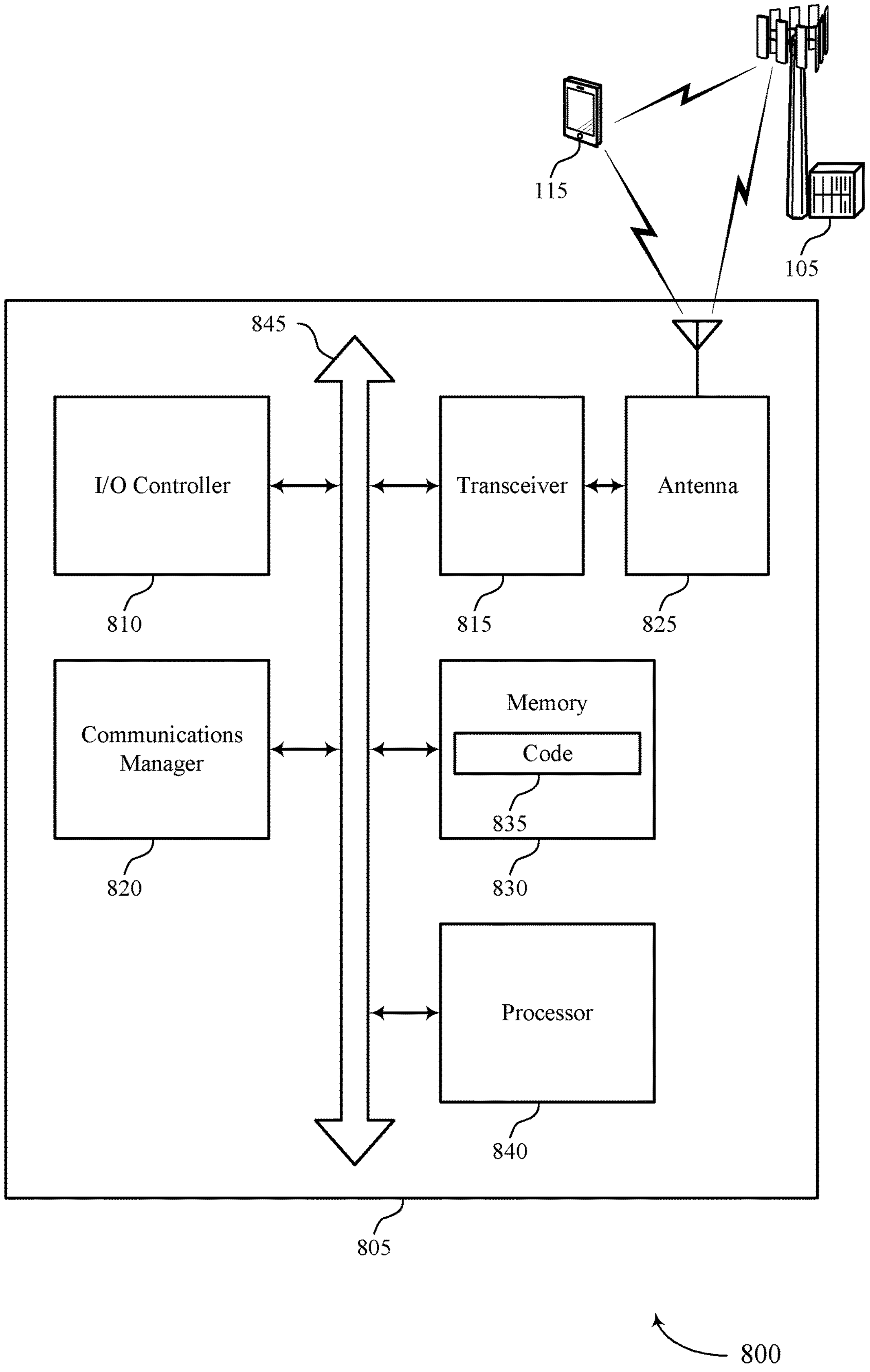
FIG. 8 shows a diagram of a system including a device that supports uplink channel state information reporting in accordance with aspects of the present disclosure.

FIG. 8 shows a diagram of a system 800 including a device 805 that supports uplink CSI reporting in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink CSI reporting). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, one or more CSI-RSs. The communications manager 820 may be configured as or otherwise support a means for performing one or more CSI measurements on the one or more CSI-RSs. The communications manager 820 may be configured as or otherwise support a means for transmitting, to the base station, an uplink CSI report including a set of candidate TPMIs, a set of candidate rank indicators, or a combination thereof based on the one or more CSI measurements. The communications manager 820 may be configured as or otherwise support a means for receiving, from the base station and in response to transmission of the uplink CSI report, DCI including an indication of a TPMI to be used by the UE for uplink signaling.

By including or configuring the communications manager 820 in accordance with examples as described herein, the device 805 may support techniques for increased data capacity, increased data throughput, and increased spectral efficiency by uplink CSI reporting for improved channel estimation and channel sounding.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of uplink CSI reporting as described herein, or the processor 840 and the memory 830 may be otherwise configured to perform or support such operations.

Figure 9:
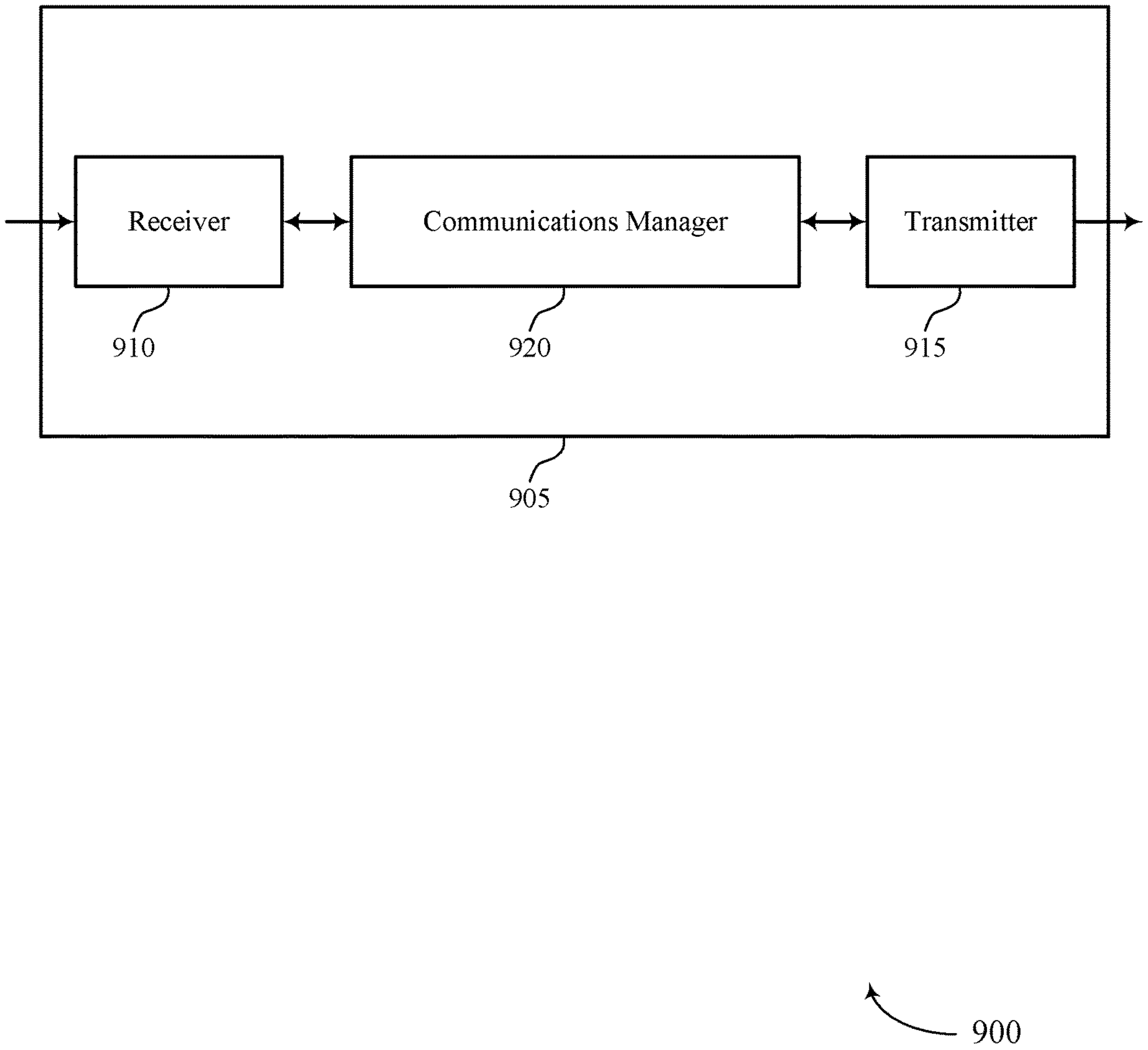
FIGS. 9 and 10 show block diagrams of devices that support uplink channel state information reporting in accordance with aspects of the present disclosure.

FIG. 9 shows a block diagram 900 of a device 905 that supports uplink CSI reporting in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink CSI reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink CSI reporting). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink CSI reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, one or more CSI-RSs. The communications manager 920 may be configured as or otherwise support a means for receiving, from the UE, an uplink CSI report including a set of candidate TPMIs, a set of candidate rank indicators, or a combination thereof based on the one or more CSI-RSs. The communications manager 920 may be configured as or otherwise support a means for transmitting, to the UE and in response to receiving the uplink CSI report, DCI including an indication of a TPMI to be used by the UE for uplink signaling.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources by performing complementary measurements and reporting for channel estimation and channel sounding.

Figure 10:
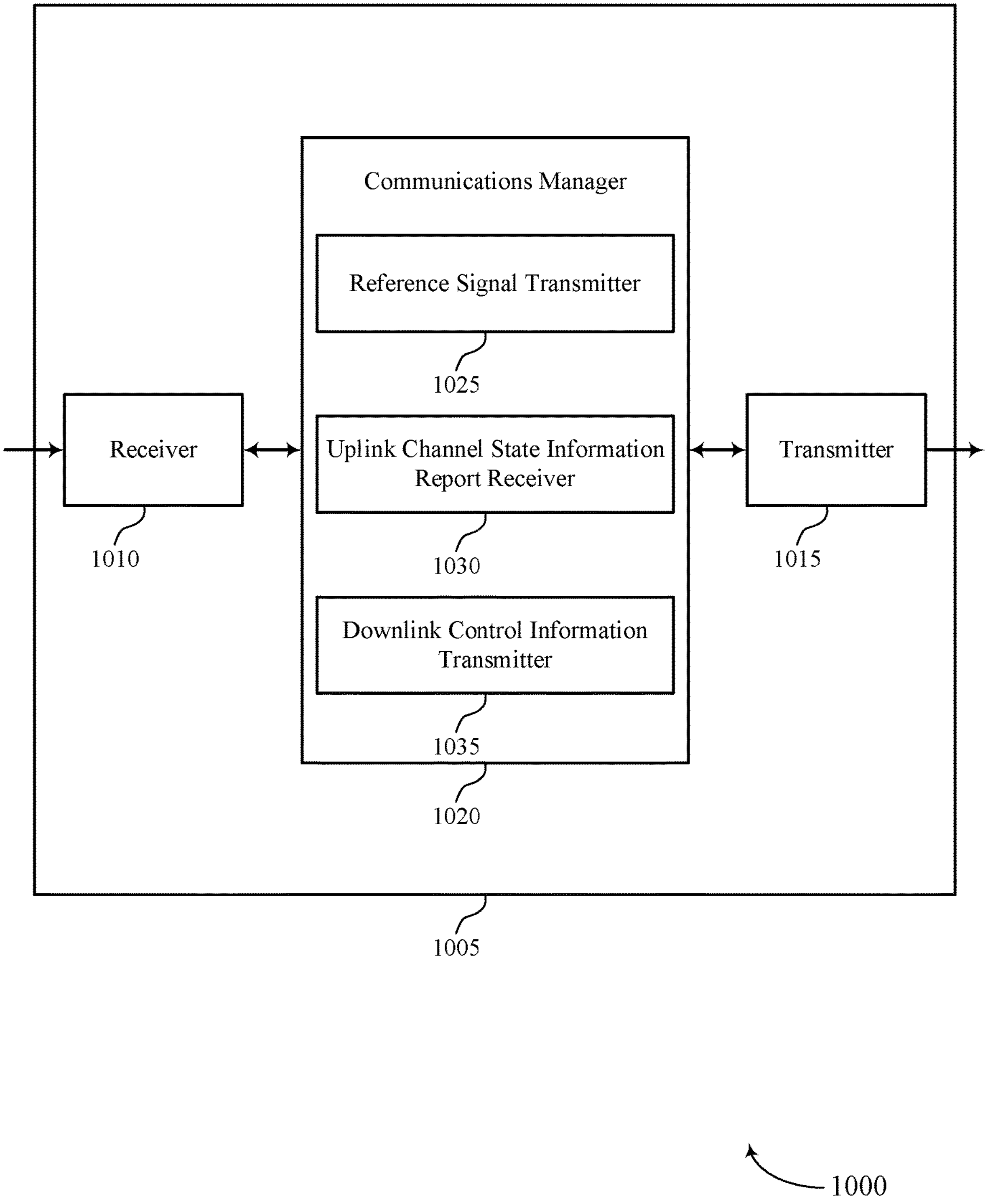

FIG. 10 shows a block diagram 1000 of a device 1005 that supports uplink CSI reporting in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink CSI reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink CSI reporting). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink CSI reporting as described herein. For example, the communications manager 1020 may include a reference signal transmitter 1025, an uplink CSI report receiver 1030, a DCI transmitter 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The reference signal transmitter 1025 may be configured as or otherwise support a means for transmitting, to a UE, one or more CSI-RSs. The uplink CSI report receiver 1030 may be configured as or otherwise support a means for receiving, from the UE, an uplink CSI report including a set of candidate TPMIs, a set of candidate rank indicators, or a combination thereof based on the one or more CSI-RSs. The DCI transmitter 1035 may be configured as or otherwise support a means for transmitting, to the UE and in response to receiving the uplink CSI report, DCI including an indication of a TPMI to be used by the UE for uplink signaling.

Figure 11:
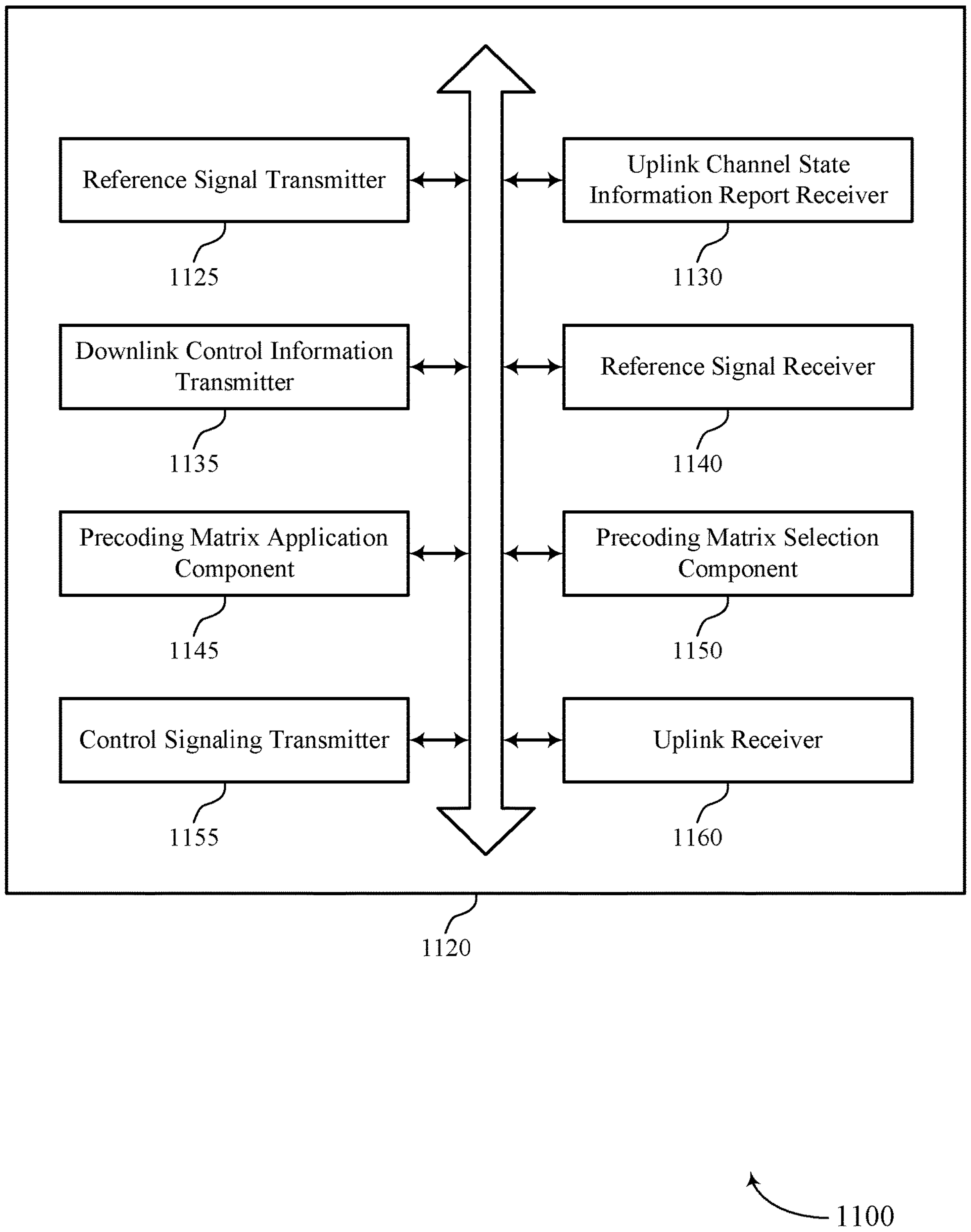
FIG. 11 shows a block diagram of a communications manager that supports uplink channel state information reporting in accordance with aspects of the present disclosure.

FIG. 11 shows a block diagram 1100 of a communications manager 1120 that supports uplink CSI reporting in accordance with aspects of the present disclosure. The communications manager 1120 may be an example of aspects of a communications manager 920, a communications manager 1020, or both, as described herein. The communications manager 1120, or various components thereof, may be an example of means for performing various aspects of uplink CSI reporting as described herein. For example, the communications manager 1120 may include a reference signal transmitter 1125, an uplink CSI report receiver 1130, a DCI transmitter 1135, a reference signal receiver 1140, a precoding matrix application component 1145, a precoding matrix selection component 1150, a control signaling transmitter 1155, an uplink receiver 1160, or any combination thereof. Each of these components may communicate, directly or indirectly, with one another (e.g., via one or more buses).

The communications manager 1120 may support wireless communications at a base station in accordance with examples as disclosed herein. The reference signal transmitter 1125 may be configured as or otherwise support a means for transmitting, to a UE, one or more CSI-RSs. The uplink CSI report receiver 1130 may be configured as or otherwise support a means for receiving, from the UE, an uplink CSI report including a set of candidate TPMIs, a set of candidate rank indicators, or a combination thereof based on the one or more CSI-RSs. The DCI transmitter 1135 may be configured as or otherwise support a means for transmitting, to the UE and in response to receiving the uplink CSI report, DCI including an indication of a TPMI to be used by the UE for uplink signaling.

In some examples, to support transmitting the one or more CSI-RSs, the reference signal transmitter 1125 may be configured as or otherwise support a means for transmitting the one or more CSI-RSs using a first set of ports.

In some examples, the uplink receiver 1160 may be configured as or otherwise support a means for receiving, from the UE using the first set of ports, uplink signaling according to the indicated TPMI.

In some examples, the reference signal receiver 1140 may be configured as or otherwise support a means for receiving, from the UE, one or more SRSs. In some examples, the precoding matrix application component 1145 may be configured as or otherwise support a means for applying, to the one or more SRSs, a set of multiple TPMIs including the set of candidate TPMIs. In some examples, the precoding matrix selection component 1150 may be configured as or otherwise support a means for selecting, from the set of multiple TPMIs, the PMI, where transmitting the DCI is based on the selecting.

In some examples, the control signaling transmitter 1155 may be configured as or otherwise support a means for transmitting, to the UE, control signaling including an indication of a number of candidate TPMIs in the set of candidate TPMIs, a number of rank indicators to include in the uplink CSI report, a wideband reporting mode, a subband reporting mode, or any combination thereof.

In some examples, to support transmitting the control signaling, the control signaling transmitter 1155 may be configured as or otherwise support a means for transmitting the control signaling during a CSI-RS configuration procedure. In some examples, the control signaling includes RRC signaling, a MAC-CE, or a combination thereof. In some examples, the indication is associated with a CSI-RS resource, a set of CSI resources, or a combination thereof.

In some examples, to support transmitting the DCI, the DCI transmitter 1135 may be configured as or otherwise support a means for transmitting a single-stage DCI message including an index associated with a PMI of the set of candidate PMIs.

In some examples, to support transmitting the DCI, the DCI transmitter 1135 may be configured as or otherwise support a means for transmitting a first two-stage DCI message indicating that the indication of the TPMI for uplink signaling is located in a second two-stage DCI message. In some examples, to support transmitting the DCI, the DCI transmitter 1135 may be configured as or otherwise support a means for the second two-stage DCI message including the indication of the TPMI based on receiving the first two-stage DCI message.

In some examples, first two-stage downlink control information message may indicate that the TPMI is one of the set of candidate PMIs. In some examples, the first two-stage downlink control information message may indicate that the TPMI is not one of the set of candidate PMIs. In some examples, transmitting the first two-stage DCI message includes transmitting, in the first two-stage DCI message, a set of time and frequency resources on which to receive the second two-stage DCI message.

In some examples, the reference signal receiver 1140 may be configured as or otherwise support a means for receiving one or more SRSs from the UE on a first set of frequency resources that is different than a second set of frequency resources on which the UE transmits the uplink signaling. In some examples, the DCI transmitter 1135 may be configured as or otherwise support a means for transmitting, to the UE based on transmitting the SRSs, second DCI including a second indication of a second TPMI for uplink signaling on the first set of frequency resources, where the PMI is associated with the uplink signaling on the second set of frequency resources.

Figure 12:
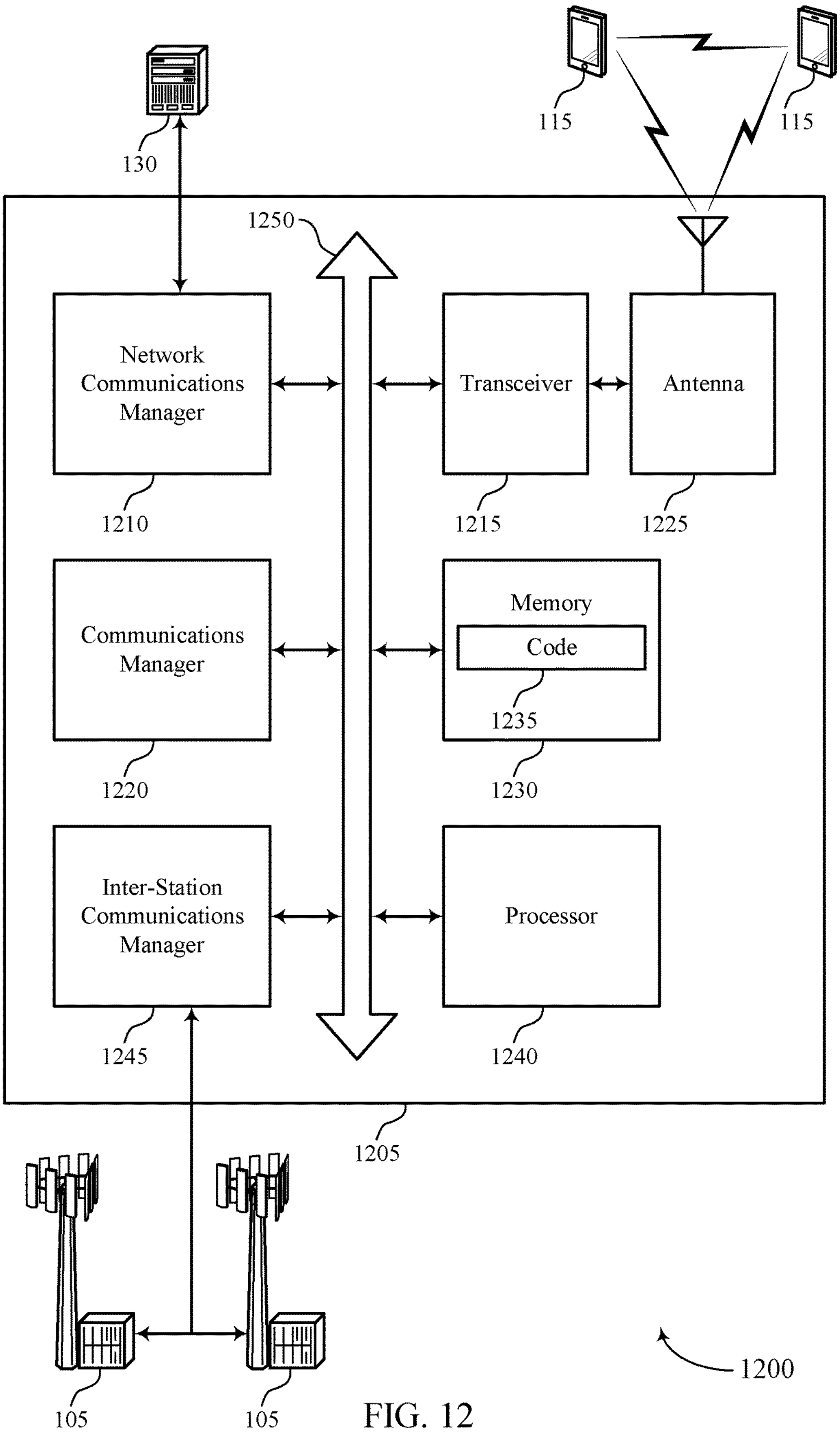
FIG. 12 shows a diagram of a system including a device that supports uplink channel state information reporting in accordance with aspects of the present disclosure.

FIG. 12 shows a diagram of a system 1200 including a device 1205 that supports uplink CSI reporting in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink CSI reporting). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, one or more CSI-RSs. The communications manager 1220 may be configured as or otherwise support a means for receiving, from the UE, an uplink CSI report including a set of candidate TPMIs, a set of candidate rank indicators, or a combination thereof based on the one or more CSI-RSs. The communications manager 1220 may be configured as or otherwise support a means for transmitting, to the UE and in response to receiving the uplink CSI report, DCI including an indication of a TPMI to be used by the UE for uplink signaling.

By including or configuring the communications manager 1220 in accordance with examples as described herein, the device 1205 may support techniques for increased data capacity, increased data throughput, and increased spectral efficiency by uplink CSI reporting for improved channel estimation and channel sounding.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink CSI reporting as described herein, or the processor 1240 and the memory 1230 may be otherwise configured to perform or support such operations.

Figure 13:
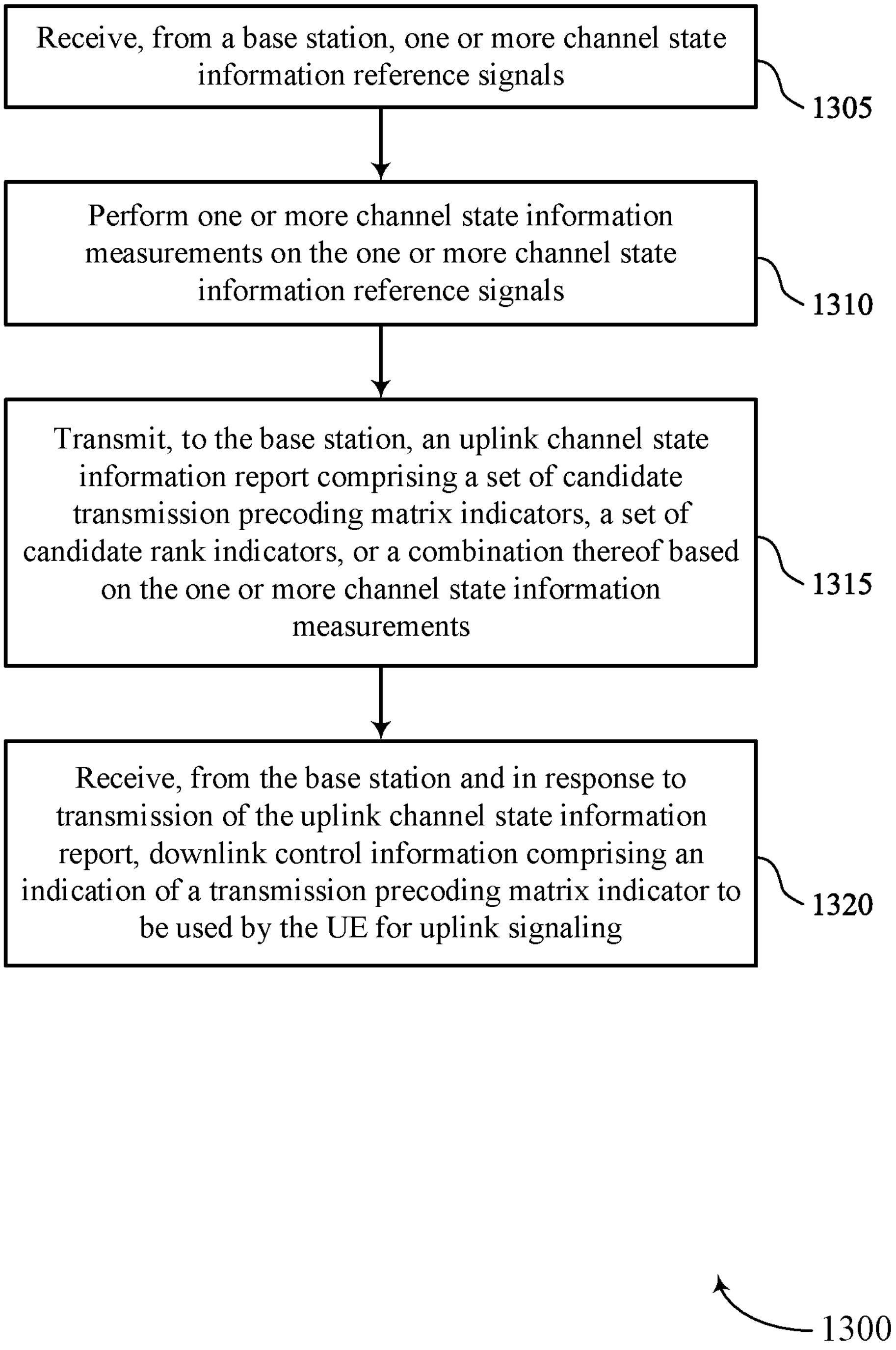
FIGS. 13 through 16 show flowcharts illustrating methods that support uplink channel state information reporting in accordance with aspects of the present disclosure.

FIG. 13 shows a flowchart illustrating a method 1300 that supports uplink CSI reporting in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, one or more CSI-RSs. The operations of 1305 may be performed in accordance with examples as disclosed herein. In some examples, aspects of the operations of 1305 may be performed by a reference signal receiver 725 as described with reference to FIG. 7.

At 1310, the method may include performing one or more CSI measurements on the one or more CSI-RSs. The operations of 1310 may be performed in accordance with examples as disclosed herein. In some examples, aspects of the operations of 1310 may be performed by a CSI measurement component 730 as described with reference to FIG. 7.

At 1315, the method may include transmitting, to the base station, an uplink CSI report including a set of candidate TPMIs, a set of candidate rank indicators, or a combination thereof based on the one or more CSI measurements. The operations of 1315 may be performed in accordance with examples as disclosed herein. In some examples, aspects of the operations of 1315 may be performed by an uplink channel information report transmitter 735 as described with reference to FIG. 7.

At 1320, the method may include receiving, from the base station and in response to transmission of the uplink CSI report, DCI including an indication of a TPMI to be used by the UE for uplink signaling. The operations of 1320 may be performed in accordance with examples as disclosed herein. In some examples, aspects of the operations of 1320 may be performed by a DCI receiver 740 as described with reference to FIG. 7.

Figure 14:
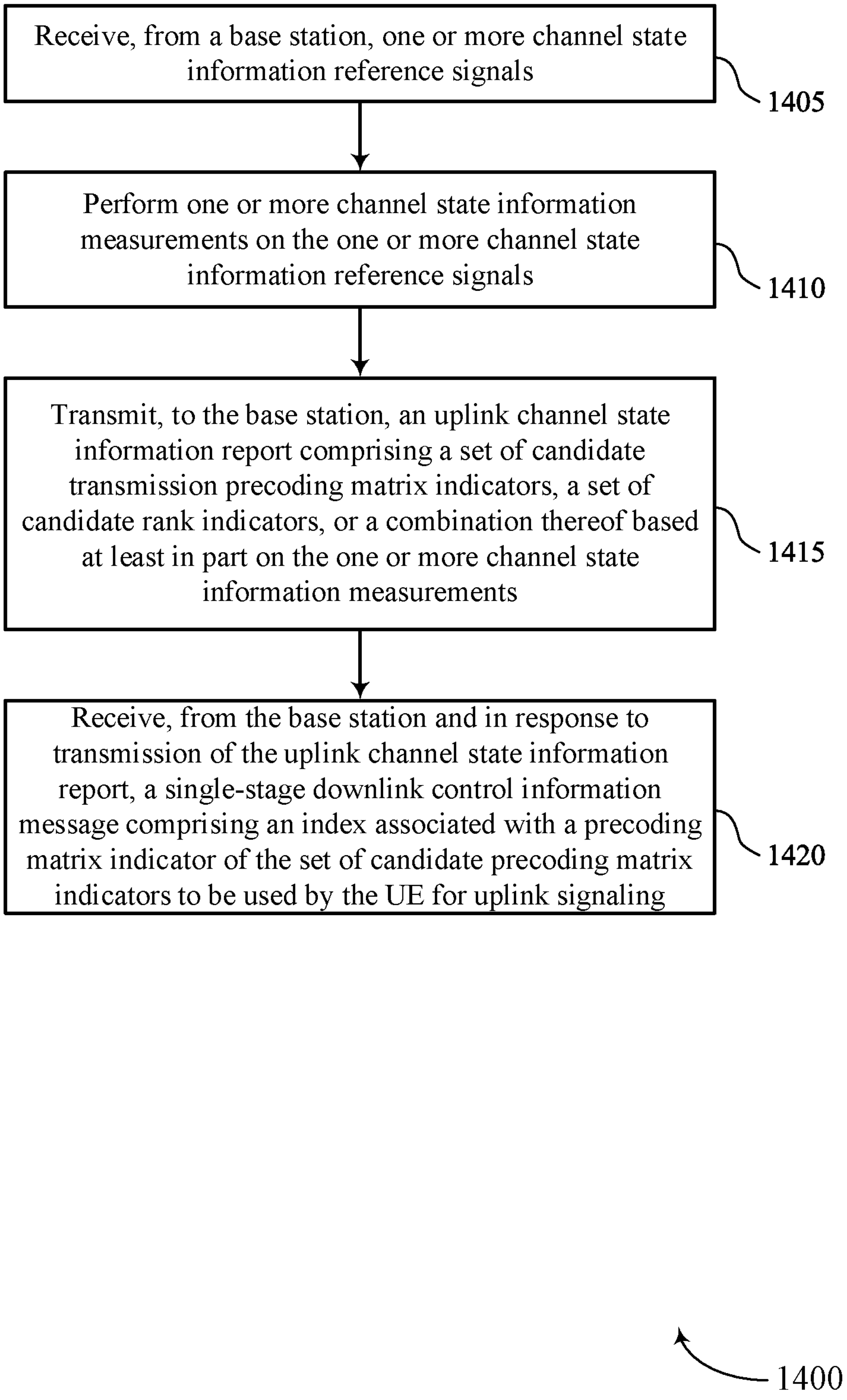

FIG. 14 shows a flowchart illustrating a method 1400 that supports uplink CSI reporting in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more CSI-RSs. The operations of 1405 may be performed in accordance with examples as disclosed herein. In some examples, aspects of the operations of 1405 may be performed by a reference signal receiver 725 as described with reference to FIG. 7.

At 1410, the method may include performing one or more CSI measurements on the one or more CSI-RSs. The operations of 1410 may be performed in accordance with examples as disclosed herein. In some examples, aspects of the operations of 1410 may be performed by a CSI measurement component 730 as described with reference to FIG. 7.

At 1415, the method may include transmitting, to the base station, an uplink CSI report including a set of candidate TPMIs, a set of candidate rank indicators, or a combination thereof based on the one or more CSI measurements. The operations of 1415 may be performed in accordance with examples as disclosed herein. In some examples, aspects of the operations of 1415 may be performed by an uplink channel information report transmitter 735 as described with reference to FIG. 7.

At 1420, the method may include receiving, from the base station and in response to transmission of the uplink CSI report, single-stage DCI message including an index associated with a PMI to be used by the UE for uplink signaling. The operations of 1420 may be performed in accordance with examples as disclosed herein. In some examples, aspects of the operations of 1420 may be performed by a DCI receiver 740 as described with reference to FIG. 7.

Figure 15:
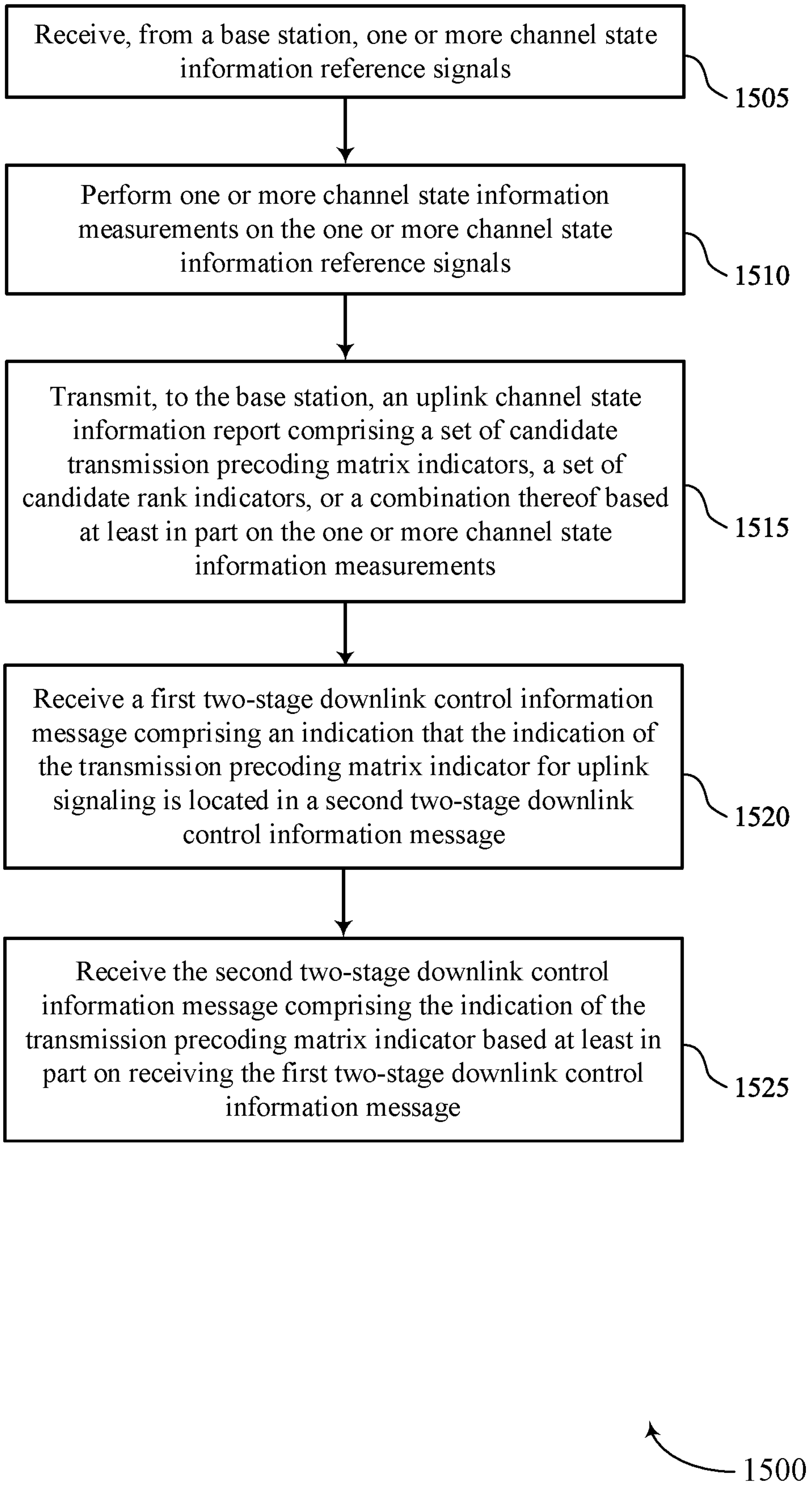

FIG. 15 shows a flowchart illustrating a method 1500 that supports uplink CSI reporting in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, one or more CSI-RSs. The operations of 1505 may be performed in accordance with examples as disclosed herein. In some examples, aspects of the operations of 1505 may be performed by a reference signal receiver 725 as described with reference to FIG. 7.

At 1510, the method may include performing one or more CSI measurements on the one or more CSI-RSs. The operations of 1510 may be performed in accordance with examples as disclosed herein. In some examples, aspects of the operations of 1510 may be performed by a CSI measurement component 730 as described with reference to FIG. 7.

At 1515, the method may include transmitting, to the base station, an uplink CSI report including a set of candidate TPMIs, a set of candidate rank indicators, or a combination thereof based on the one or more CSI measurements. The operations of 1515 may be performed in accordance with examples as disclosed herein. In some examples, aspects of the operations of 1515 may be performed by an uplink channel information report transmitter 735 as described with reference to FIG. 7.

At 1520, the method may include receiving a first two-stage DCI message indicating that the indication of the TPMI for uplink signaling is located in a second two-stage DCI message. The operations of 1520 may be performed in accordance with examples as disclosed herein. In some examples, aspects of the operations of 1520 may be performed by a DCI receiver 740 as described with reference to FIG. 7.

At 1525, the method may include receiving the second two-stage DCI message including the indication of the TPMI based on receiving the first two-stage DCI message. The operations of 1525 may be performed in accordance with examples as disclosed herein. In some examples, aspects of the operations of 1525 may be performed by a DCI receiver 740 as described with reference to FIG. 7.

Figure 16:
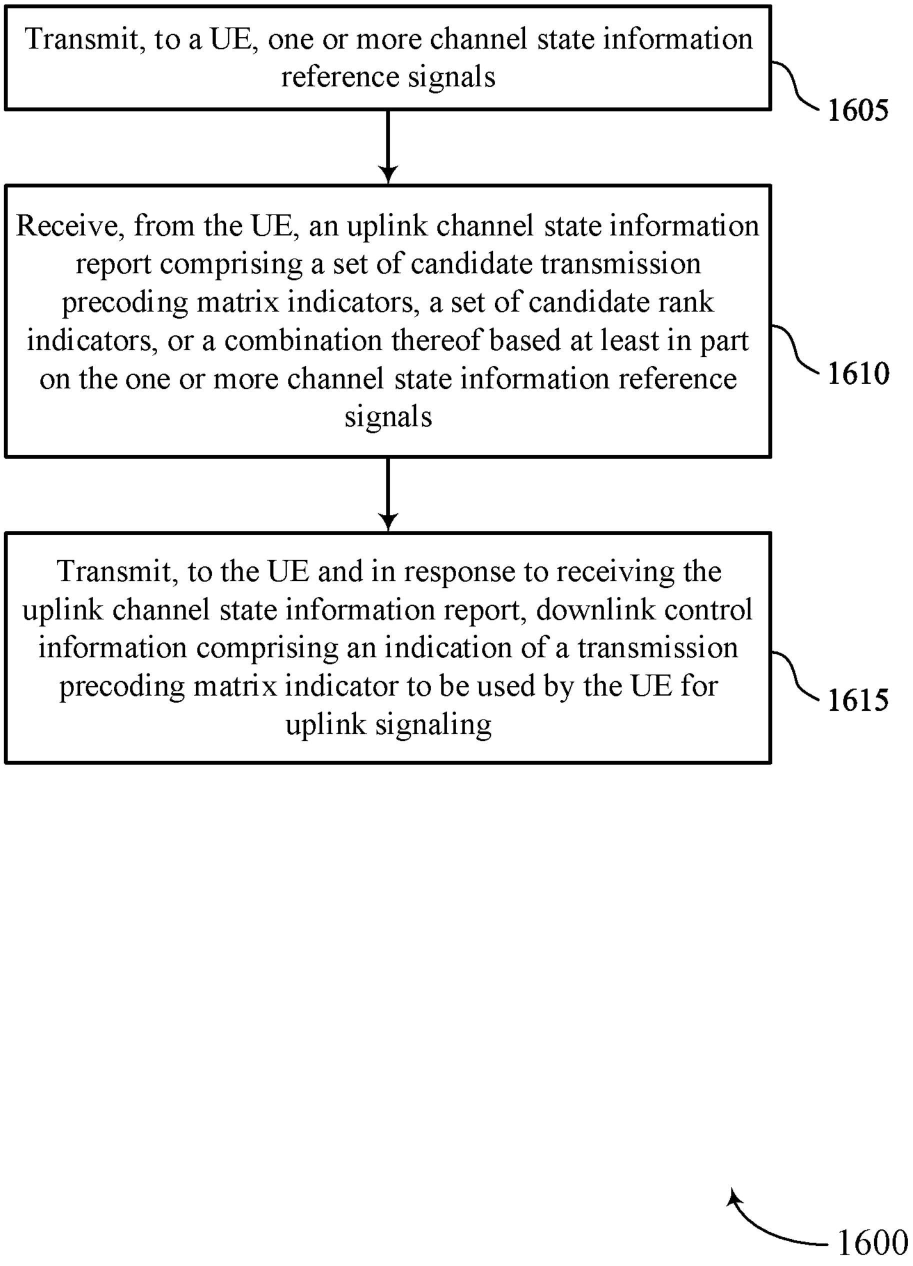

FIG. 16 shows a flowchart illustrating a method 1600 that supports uplink CSI reporting in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, one or more CSI-RSs. The operations of 1605 may be performed in accordance with examples as disclosed herein. In some examples, aspects of the operations of 1605 may be performed by a reference signal transmitter 1125 as described with reference to FIG. 11.

At 1610, the method may include receiving, from the UE, an uplink CSI report including a set of candidate TPMIs, a set of candidate rank indicators, or a combination thereof based on the one or more CSI-RSs. The operations of 1610 may be performed in accordance with examples as disclosed herein. In some examples, aspects of the operations of 1610 may be performed by an uplink CSI report receiver 1130 as described with reference to FIG. 11.

At 1615, the method may include transmitting, to the UE and in response to receiving the uplink CSI report, DCI including an indication of a TPMI to be used by the UE for uplink signaling. The operations of 1615 may be performed in accordance with examples as disclosed herein. In some examples, aspects of the operations of 1615 may be performed by a DCI transmitter 1135 as described with reference to FIG. 11.

The following provides an overview of aspects of the present disclosure:

Aspect 1: A method for wireless communications at a UE, comprising: receiving, from a base station, one or more channel state information reference signals; performing one or more channel state information measurements on the one or more channel state information reference signals; transmitting, to the base station, an uplink channel state information report comprising a set of candidate transmission precoding matrix indicators, a set of candidate rank indicators, or a combination thereof based at least in part on the one or more channel state information measurements; and receiving, from the base station and in response to transmission of the uplink channel state information report, downlink control information comprising an indication of a transmission precoding matrix indicator to be used by the UE for uplink signaling.

Aspect 2: The method of aspect 1, further comprising: monitoring for the one or more channel state information reference signals using a first set of ports, wherein receiving the one or more channel state information reference signals is based at least in part on the monitoring; and transmitting, to the base station, uplink signaling using the indicated transmission precoding matrix indicator for uplink signaling on a physical uplink shared channel using the first set of ports.

Aspect 3: The method of aspect 2, wherein transmitting the uplink channel state information report comprises: transmitting, in the uplink channel state information report, an indication of a set of channel resource indicators, each channel resource indicator of the set of channel resource indicators associated with a candidate transmission precoding matrix indicator of the set of candidate transmission precoding matrix indicators.

Aspect 4: The method of any of aspects 1 through 3, further comprising: receiving, from the base station, control signaling comprising an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

Aspect 5: The method of aspect 4, wherein receiving the control signaling comprises: receiving the control signaling during a channel state information reference signal configuration procedure.

Aspect 6: The method of any of aspects 4 through 5, wherein the control signaling comprises radio resource control signaling, a MAC control element (CE), or a combination thereof.

Aspect 7: The method of any of aspects 4 through 6, wherein the control signaling comprising the indication is associated with a channel state information reference signal resource, a set of channel state information resources, or a combination thereof.

Aspect 8: The method of any of aspects 1 through 7, wherein receiving the downlink control information comprises: receiving a single-stage downlink control information message comprising an index associated with a precoding matrix indicator of the set of candidate transmission precoding matrix indicators.

Aspect 9: The method of any of aspects 1 through 8, wherein receiving the downlink control information comprises: receiving a first two-stage downlink control information message indicating that the indication of the transmission precoding matrix indicator for uplink signaling is located in a second two-stage downlink control information message; and receiving the second two-stage downlink control information message comprising the indication of the transmission precoding matrix indicator based at least in part on receiving the first two-stage downlink control information message.

Aspect 10: The method of aspect 9, wherein the indication that the indication of the transmission precoding matrix indicator is located in the second two-stage downlink control information message comprises an indication that the transmission precoding matrix indicator is one of the set of candidate transmission precoding matrix indicators.

Aspect 11: The method of any of aspects 9 through 10, wherein the indication that the indication of the transmission precoding matrix indicator is located in the second two-stage downlink control information message comprises an indication that the transmission precoding matrix indicator is not one of the set of candidate transmission precoding matrix indicators.

Aspect 12: The method of any of aspects 9 through 11, further comprising: receiving, in the first two-stage downlink control information message, set of time and frequency resources on which to receive the second two-stage downlink control information message.

Aspect 13: The method of any of aspects 1 through 12, further comprising: transmitting one or more sounding reference signals to the base station on a first set of frequency resources that is different than a second set of frequency resources on which the UE transmits the uplink signaling; and receiving, from the base station based at least in part on transmitting the sounding reference signals, second downlink control information comprising a second indication of a second transmission precoding matrix indicator for uplink signaling on the first set of frequency resources, wherein the precoding matrix indicator is associated with the uplink signaling on the second set of frequency resources.

Aspect 14: A method for wireless communications at a base station, comprising: transmitting, to a UE, one or more channel state information reference signals; receiving, from the UE, an uplink channel state information report comprising a set of candidate transmission precoding matrix indicators, a set of candidate rank indicators, or a combination thereof based at least in part on the one or more channel state information reference signals; transmitting, to the UE and in response to receiving the uplink channel state information report, downlink control information comprising an indication of a transmission precoding matrix indicator to be used by the UE for uplink signaling.

Aspect 15: The method of aspect 14, wherein transmitting the one or more channel state information reference signals comprises: transmitting the one or more channel state information reference signals using a first set of ports.

Aspect 16: The method of aspect 15, further comprising: receiving, from the UE using the first set of ports, uplink signaling according to the indicated transmission precoding matrix indicator.

Aspect 17: The method of any of aspects 14 through further comprising: receiving, from the UE, one or more sounding reference signals; applying, to the one or more sounding reference signals, a plurality of transmission precoding matrix indicators comprising the set of candidate transmission precoding matrix indicators; selecting, from the plurality of transmission precoding matrix indicators, the precoding matrix indicator, wherein transmitting the downlink control information is based at least in part on the selecting.

Aspect 18: The method of any of aspects 14 through 17, further comprising: transmitting, to the UE, control signaling comprising an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

Aspect 19: The method of aspect 18, wherein transmitting the control signaling comprises: transmitting the control signaling during a channel state information reference signal configuration procedure.

Aspect 20: The method of any of aspects 18 through 19, wherein the control signaling comprises radio resource control signaling, a MAC control element (CE), or a combination thereof.

Aspect 21: The method of any of aspects 18 through 20, wherein the control signaling comprising the indication is associated with a channel state information reference signal resource, a set of channel state information resources, or a combination thereof.

Aspect 22: The method of any of aspects 14 through 21, wherein transmitting the downlink control information comprises: transmitting a single-stage downlink control information message comprising an index associated with a precoding matrix indicator of the set of candidate transmission precoding matrix indicators.

Aspect 23: The method of any of aspects 14 through 22, wherein transmitting the downlink control information comprises: transmitting a first two-stage downlink control information message indicating that the indication of the transmission precoding matrix indicator for uplink signaling is located in a second two-stage downlink control information message; and the second two-stage downlink control information message comprising the indication of the transmission precoding matrix indicator based at least in part on receiving the first two-stage downlink control information message.

Aspect 24: The method of aspect 23, wherein the indication that the indication of the transmission precoding matrix indicator is located in the second two-stage downlink control information message comprises an indication that the transmission precoding matrix indicator is one of the set of candidate transmission precoding matrix indicators.

Aspect 25: The method of any of aspects 23 through 24, wherein the indication that the indication of the transmission precoding matrix indicator is located in the second two-stage downlink control information message comprises an indication that the transmission precoding matrix indicator is not one of the set of candidate transmission precoding matrix indicators.

Aspect 26: The method of any of aspects 23 through 25, wherein transmitting the first two-stage downlink control information message comprises transmitting, in the first two-stage downlink control information message, a set of time and frequency resources on which to receive the second two-stage downlink control information message.

Aspect 27: The method of any of aspects 14 through 26, further comprising: receiving one or more sounding reference signals from the UE on a first set of frequency resources that is different than a second set of frequency resources on which the UE transmits the uplink signaling; and transmitting, to the UE based at least in part on transmitting the sounding reference signals, second downlink control information comprising a second indication of a second transmission precoding matrix indicator for uplink signaling on the first set of frequency resources, wherein the precoding matrix indicator is associated with the uplink signaling on the second set of frequency resources.

Aspect 28: An apparatus for wireless communications at a UE, comprising a processor; memory coupled with the processor; and instructions stored in the memory and executable by the processor to cause the apparatus to perform a method of any of aspects 1 through 13.

Aspect 29: An apparatus for wireless communications at a UE, comprising at least one means for performing a method of any of aspects 1 through 13.

Aspect 30: A non-transitory computer-readable medium storing code for wireless communications at a UE, the code comprising instructions executable by a processor to perform a method of any of aspects 1 through 13.

Aspect 31: An apparatus for wireless communications at a base station, comprising a processor; memory coupled with the processor; and instructions stored in the memory and executable by the processor to cause the apparatus to perform a method of any of aspects 14 through 27.

Aspect 32: An apparatus for wireless communications at a base station, comprising at least one means for performing a method of any of aspects 14 through 27.

Aspect 33: A non-transitory computer-readable medium storing code for wireless communications at a base station, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

a memory; and a processor, coupled to the memory, and configured to:

monitor for one or more channel state information reference signals using a first set of ports;

receive, from a base station, the one or more channel state information reference signals based at least in part on the monitoring;

perform one or more channel state information measurements on the one or more channel state information reference signals;

transmit, to the base station, an uplink channel state information report comprising a set of candidate transmission precoding matrix indicators, a set of candidate rank indicators, or a combination thereof based at least in part on the one or more channel state information measurements, the uplink channel state information report further comprising an indication of a set of channel resource indicators, each channel resource indicator of the set of channel resource indicators associated with a candidate transmission precoding matrix indicator of the set of candidate transmission precoding matrix indicators;

receive, from the base station and in response to transmission of the uplink channel state information report, downlink control information comprising an indication of a transmission precoding matrix indicator to be used by the UE for uplink signaling; and transmit, to the base station, uplink signaling using the indicated transmission precoding matrix indicator for uplink signaling on a physical uplink shared channel using the first set of ports.

2. The apparatus of claim 1, wherein the apparatus is further configured to:

receive, from the base station, control signaling comprising an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

3. The apparatus of claim 2, wherein the apparatus configured to receive the control signaling is further configured to:

receive the control signaling during a channel state information reference signal configuration procedure.

4. The apparatus of claim 2, wherein the control signaling comprises radio resource control signaling, a media access control (MAC) control element (CE), or a combination thereof.

5. The apparatus of claim 2, wherein the control signaling comprising the indication is associated with a channel state information reference signal resource, a set of channel state information resources, or a combination thereof.

6. The apparatus of claim 1, wherein the apparatus configured to receive the downlink control information is further configured to:

receive a single-stage downlink control information message comprising an index associated with a precoding matrix indicator of the set of candidate transmission precoding matrix indicators.

7. The apparatus of claim 1, wherein the apparatus configured to receive the downlink control information is further configured to:

receive a first two-stage downlink control information message indicating that the indication of the transmission precoding matrix indicator for uplink signaling is located in a second two-stage downlink control information message; and receive the second two-stage downlink control information message comprising the indication of the transmission precoding matrix indicator based at least in part on receiving the first two-stage downlink control information message.

8. The apparatus of claim 7, wherein the first two-stage downlink control information message indicates that the transmission precoding matrix indicator is one of the set of candidate transmission precoding matrix indicators.

9. The apparatus of claim 7, wherein the first two-stage downlink control information message indicates that the transmission precoding matrix indicator is not one of the set of candidate transmission precoding matrix indicators.

10. The apparatus of claim 7, wherein the apparatus is further configured to:

receive, in the first two-stage downlink control information message, a set of time and frequency resources on which to receive the second two-stage downlink control information message.

11. The apparatus of claim 1, wherein the apparatus is further configured to:

transmit one or more sounding reference signals to the base station on a first set of frequency resources that is different than a second set of frequency resources on which the UE transmits the uplink signaling; and receive, from the base station based at least in part on transmitting the one or more sounding reference signals, second downlink control information comprising a second indication of a second transmission precoding matrix indicator for uplink signaling on the first set of frequency resources, wherein the transmission precoding matrix indicator is associated with the uplink signaling on the second set of frequency resources.

12. An apparatus for wireless communications at a base station, comprising:

a memory; and a processor, coupled to the memory, and configured to:

transmit, to a user equipment (UE), one or more channel state information reference signals using a first set of ports;

receive, from the UE, an uplink channel state information report comprising a set of candidate transmission precoding matrix indicators, a set of candidate rank indicators, or a combination thereof based at least in part on the one or more channel state information reference signals, the uplink channel state information report further comprising an indication of a set of channel resource indicators, each channel resource indicator of the set of channel resource indicators associated with a candidate transmission precoding matrix indicator of the set of candidate transmission precoding matrix indicators;

transmit, to the UE and in response to receiving the uplink channel state information report, downlink control information comprising an indication of a transmission precoding matrix indicator to be used by the UE for uplink signaling; and receive, from the UE, uplink signaling using the indicated transmission precoding matrix indicator for uplink signaling on a physical uplink shared channel, wherein the uplink signaling is transmitted using the first set of ports.

13. The apparatus of claim 12, wherein the apparatus is further configured to:

receive, from the UE, one or more sounding reference signals;

apply, to the one or more sounding reference signals, a plurality of transmission precoding matrix indicators comprising the set of candidate transmission precoding matrix indicators;

select, from the plurality of transmission precoding matrix indicators, the transmission precoding matrix indicator, wherein transmitting the downlink control information is based at least in part on the selecting.

14. The apparatus of claim 12, wherein the apparatus is further configured to:

transmit, to the UE, control signaling comprising an indication of a number of candidate transmission precoding matrix indicators in the set of candidate transmission precoding matrix indicators, a number of rank indicators to include in the uplink channel state information report, a wideband reporting mode, a subband reporting mode, or any combination thereof.

15. The apparatus of claim 14, wherein the apparatus configured to transmit the control signaling is further configured to:

transmit the control signaling during a channel state information reference signal configuration procedure.

16. The apparatus of claim 14, wherein the control signaling comprises radio resource control signaling, a media access control (MAC) control element (CE), or a combination thereof.

17. The apparatus of claim 14, wherein the control signaling comprising the indication is associated with a channel state information reference signal resource, a set of channel state information resources, or a combination thereof.

18. The apparatus of claim 12, wherein the apparatus configured to transmit the downlink control information is further configured to:

transmit a single-stage downlink control information message comprising an index associated with a precoding matrix indicator of the set of candidate transmission precoding matrix indicators.

19. The apparatus of claim 12, wherein the apparatus configured to transmit the downlink control information is further configured to:

transmit a first two-stage downlink control information message indicating that the indication of the transmission precoding matrix indicator for uplink signaling is located in a second two-stage downlink control information message; and transmit the second two-stage downlink control information message comprising the indication of the transmission precoding matrix indicator based at least in part on receiving the first two-stage downlink control information message.

20. The apparatus of claim 19, wherein the first two-stage downlink control information message indicates that the transmission precoding matrix indicator is one of the set of candidate transmission precoding matrix indicators.

21. The apparatus of claim 19, wherein the first two-stage downlink control information message indicates that the transmission precoding matrix indicator is not one of the set of candidate transmission precoding matrix indicators.

22. The apparatus of claim 19, wherein the apparatus configured to transmit the first two-stage downlink control information message is further configured to:

transmit, in the first two-stage downlink control information message, a set of time and frequency resources on which to receive the second two-stage downlink control information message.

23. The apparatus of claim 12, wherein the apparatus is further configured to:

receive one or more sounding reference signals from the UE on a first set of frequency resources that is different than a second set of frequency resources on which the UE transmits the uplink signaling; and transmit, to the UE based at least in part on receiving the one or more sounding reference signals, second downlink control information comprising a second indication of a second transmission precoding matrix indicator for uplink signaling on the first set of frequency resources, wherein the transmission precoding matrix indicator is associated with the uplink signaling on the second set of frequency resources.

24. A method for wireless communications at a user equipment (UE), comprising:

monitoring for one or more channel state information reference signals using a first set of ports;

receiving, from a base station, the one or more channel state information reference signals based at least in part on the monitoring;

performing one or more channel state information measurements on the one or more channel state information reference signals;

transmitting, to the base station, an uplink channel state information report comprising a set of candidate transmission precoding matrix indicators, a set of candidate rank indicators, or a combination thereof based at least in part on the one or more channel state information measurements, the uplink channel state information report further comprising an indication of a set of channel resource indicators, each channel resource indicator of the set of channel resource indicators associated with a candidate transmission precoding matrix indicator of the set of candidate transmission precoding matrix indicators;

receiving, from the base station and in response to transmission of the uplink channel state information report, downlink control information comprising an indication of a transmission precoding matrix indicator to be used by the UE for uplink signaling; and transmitting, to the base station, uplink signaling using the indicated transmission precoding matrix indicator for uplink signaling on a physical uplink shared channel using the first set of ports.

25. A method for wireless communications at a base station, comprising:

transmitting, to a user equipment (UE), one or more channel state information reference signals using a first set of ports;

receiving, from the UE, an uplink channel state information report comprising a set of candidate transmission precoding matrix indicators, a set of candidate rank indicators, or a combination thereof based at least in part on the one or more channel state information reference signals, the uplink channel state information report further comprising an indication of a set of channel resource indicators, each channel resource indicator of the set of channel resource indicators associated with a candidate transmission precoding matrix indicator of the set of candidate transmission precoding matrix indicators;

transmitting, to the UE and in response to receiving the uplink channel state information report, downlink control information comprising an indication of a transmission precoding matrix indicator to be used by the UE for uplink signaling; and receive, from the UE, uplink signaling using the indicated transmission precoding matrix indicator for uplink signaling on a physical uplink shared channel, wherein the uplink signaling is transmitted using the first set of ports.

* * * * *